(12) United States Patent
Ise et al.

(10) Patent No.: US 9,893,349 B2
(45) Date of Patent: Feb. 13, 2018

(54) ACTIVE MATERIAL, NONAQUEOUS ELECTROLYTE BATTERY, BATTERY PACK, AND VEHICLE

(71) Applicant: Kabushiki Kaisha Toshiba, Minato-ku (JP)

(72) Inventors: Kazuki Ise, Kawasaki (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/260,606

(22) Filed: Sep. 9, 2016

(65) Prior Publication Data

US 2017/0077504 A1  Mar. 16, 2017

(30) Foreign Application Priority Data

Sep. 16, 2015 (JP) .................. 2015-182859

(51) Int. Cl.
*H01M 4/485* (2010.01)
*H01M 4/525* (2010.01)
(Continued)

(52) U.S. Cl.
CPC .......... *H01M 4/366* (2013.01); *H01M 4/131* (2013.01); *H01M 4/485* (2013.01);
(Continued)

(58) Field of Classification Search
CPC .............................. H01M 4/485; H01M 4/525
See application file for complete search history.

(56) References Cited

U.S. PATENT DOCUMENTS

| | | | |
|---|---|---|---|
| 2011/0206991 A1* | 8/2011 | Nakahara | C01B 25/00 429/231.5 |
| 2012/0052401 A1 | 3/2012 | Goodenough et al. | |

(Continued)

FOREIGN PATENT DOCUMENTS

| | | |
|---|---|---|
| JP | 2010-80188 A | 4/2010 |
| JP | 2010-287496 A | 12/2010 |

(Continued)

OTHER PUBLICATIONS

Lucienne Buannic et al. Abstract #395, 223rd ECS Meeting, © 2013 The Electrochemical Society.*
Ruiz et al. Chem. Mater. 2004, 16, 862-871.*

*Primary Examiner* — Olatunji Godo
(74) *Attorney, Agent, or Firm* — Oblon, McClelland, Maier & Neustadt, L.L.P.

(57) ABSTRACT

According to one embodiment, an active material is provided. The active material includes active material particles. The active material particle includes a core particle and a shell layer which covers at least a part of a surface of the core particle. The core particle contains a monoclinic or orthorhombic niobium-titanium composite oxide. The shell layer contains a compound which is at least one compound selected from the group consisting of a lithium-titanium composite oxide, an Nb-containing lithium-titanium composite oxide, a lithium-niobium composite oxide, a lithium phosphate, and an Nb-containing lithium phosphate. The compound has a composition different from that of the monoclinic or orthorhombic niobium-titanium composite oxide.

15 Claims, 13 Drawing Sheets

(51) Int. Cl.
  *H01M 4/36*    (2006.01)
  *H01M 4/58*    (2010.01)
  *H01M 4/131*   (2010.01)
  *H01M 10/052*  (2010.01)
  H01M 2/34      (2006.01)
  H01M 2/10      (2006.01)
  H01M 4/02      (2006.01)

(52) U.S. Cl.
  CPC ....... *H01M 4/5825* (2013.01); *H01M 10/052* (2013.01); *H01M 2/1077* (2013.01); *H01M 2/348* (2013.01); *H01M 2004/027* (2013.01); *H01M 2220/20* (2013.01); *Y02E 60/122* (2013.01)

(56) References Cited

U.S. PATENT DOCUMENTS

| | | |
|---|---|---|
| 2012/0244442 A1 | 9/2012 | Harada et al. |
| 2013/0143118 A1 | 6/2013 | Harada et al. |
| 2013/0209863 A1 | 8/2013 | Harada et al. |
| 2014/0017520 A1 | 1/2014 | Inagaki et al. |
| 2014/0030597 A1 | 1/2014 | Jung et al. |
| 2014/0252267 A1* | 9/2014 | Yan .................. C07F 9/091 252/182.1 |
| 2014/0295231 A1 | 10/2014 | Ise et al. |

FOREIGN PATENT DOCUMENTS

| | | |
|---|---|---|
| JP | 5023239 B2 | 6/2012 |
| JP | 2012-199146 A | 10/2012 |
| JP | 2013-77398 A | 4/2013 |
| JP | 2013-164934 A | 8/2013 |
| JP | 2013-535787 A | 9/2013 |
| JP | 2014-22059 A | 2/2014 |
| JP | 2014-26950 A | 2/2014 |
| JP | 2014-209445 A | 11/2014 |

* cited by examiner

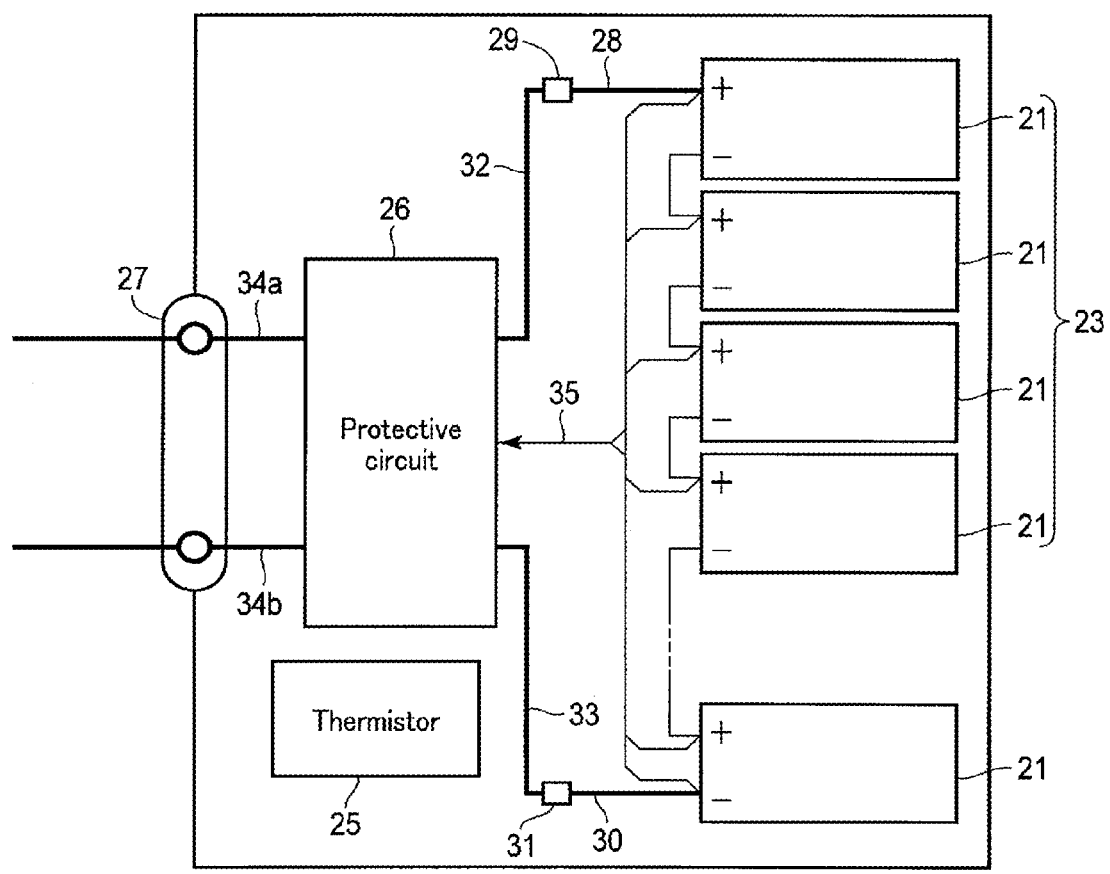
F I G. 12

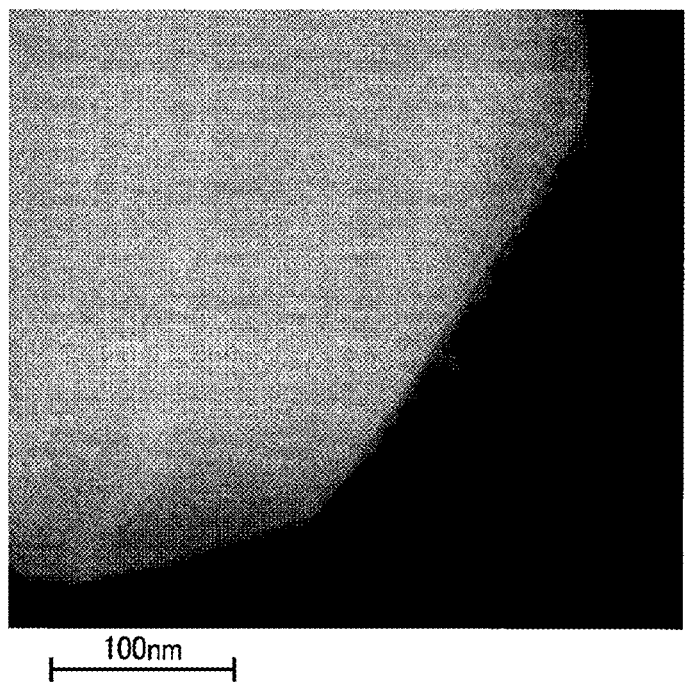
F I G. 15
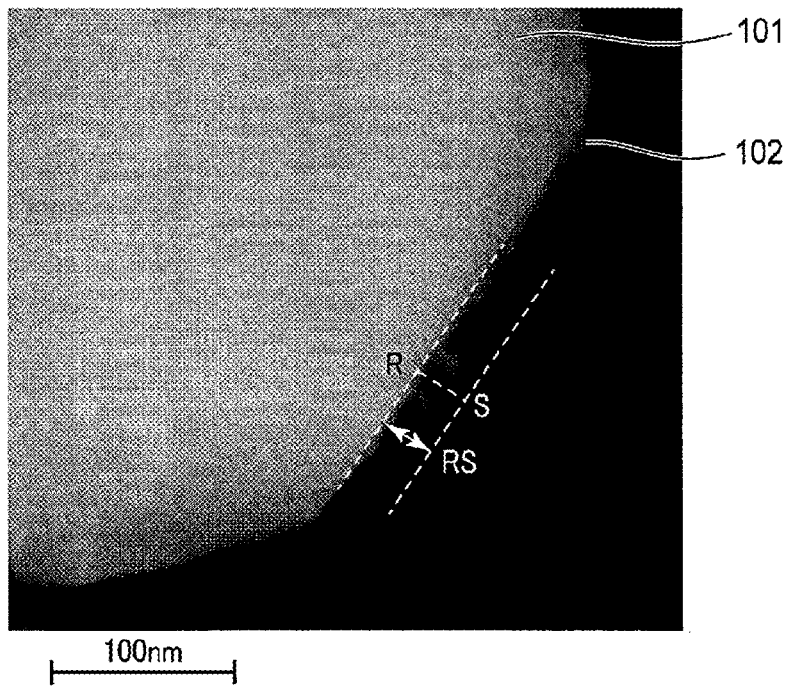
F I G. 16

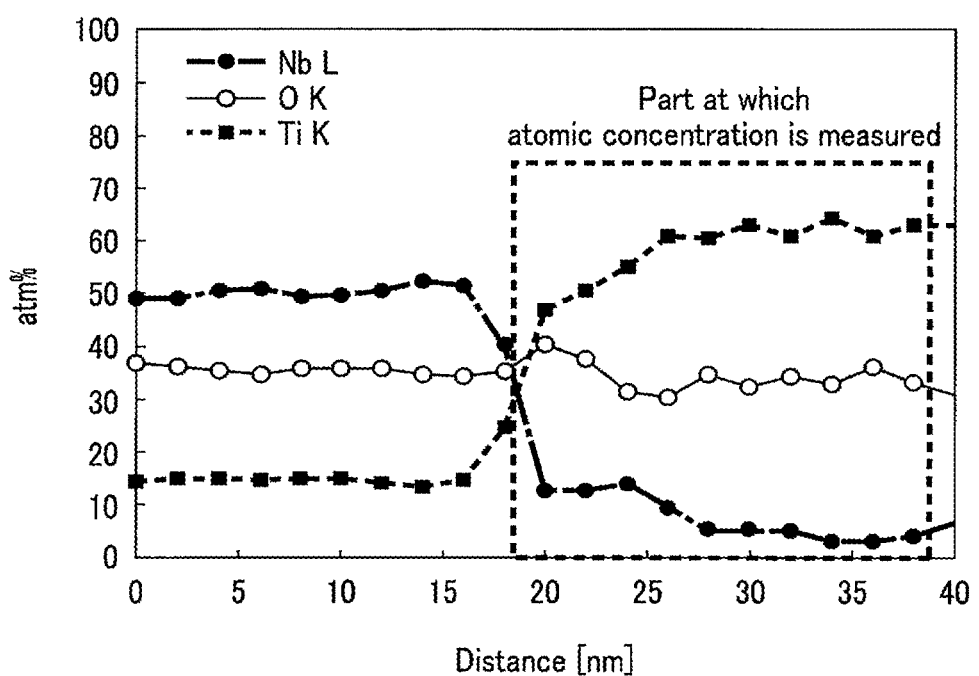
F I G. 19

ACTIVE MATERIAL, NONAQUEOUS ELECTROLYTE BATTERY, BATTERY PACK, AND VEHICLE

CROSS-REFERENCE TO RELATED APPLICATIONS

This application is based upon and claims the benefit of priority from Japanese Patent Application No. 2015-182859, filed Sep. 16, 2015, the entire contents of which are incorporated herein by reference.

FIELD

Embodiments described herein relate generally to an active material for a battery, a nonaqueous electrolyte battery, a battery pack, and vehicle.

BACKGROUND

Recently, nonaqueous electrolyte batteries such as a lithium ion secondary battery have been developed as a battery having a high energy density. The nonaqueous electrolyte battery is expected to be a power source of vehicles such as a hybrid automobile or an electric automobile, or a power source for a large-sized storage battery. In particular, with respect to the application for vehicles, it is required for the nonaqueous electrolyte battery to have other properties such as a rapid charge-and-discharge performance and a long term reliability. A nonaqueous electrolyte battery capable of rapid charge-and-discharge has an advantage of remarkably short discharge time. The nonaqueous electrolyte battery capable of rapid charge-and-discharge can improve a power performance of a hybrid automobile and can efficiently recover a regenerative energy of the power.

The rapid charge-and-discharge can be performed in a manner in which electrons and lithium ions rapidly move between a positive electrode and a negative electrode. In a battery using a carbon negative electrode, a dendrite of metal lithium may sometimes be deposited on an electrode by repeating the rapid charge-and-discharge. The dendrite causes an internal short-circuit, thus resulting in a risk of generation of heat or ignition.

Therefore, a battery in which a metal composite oxide is used as the negative electrode active material instead of a carbonaceous material has been developed. In particular, a battery using a titanium oxide as the negative electrode active material can stably perform the rapid charge-and-discharge, and has a characteristic of a longer life time compared to that of the carbon negative electrode.

The titanium oxide, however, has a potential higher (nobler) than that of the carbonaceous substance to metal lithium. In addition, the titanium oxide has a low capacity per weight. A battery using titanium oxide, accordingly, has a defect of a low energy density.

For example, the electrode potential of the titanium oxide is about 1.5 V vs. metal lithium, which is higher (nobler) than that of the carbon negative electrode. The potential of the titanium oxide is caused by an oxidation-reduction reaction between $Ti^{3+}$ and $Ti^{4+}$ when lithium is electrochemically inserted and extracted, and thus it is electrochemically limited. There is also the fact that the rapid charge-and-discharge of the lithium ions can be stably performed at a high electrode potential of about 1.5 V. In order to improve the energy density, accordingly, it is substantially difficult to decrease the electrode potential.

On the other hand, with respect to a capacity per unit weight, a lithium-titanium composite oxide such as $Li_4Ti_5O_{12}$ has a theoretical capacity of about 175 mAh/g; whereas a generally used graphite electrode material has a theoretical capacity of 372 mAh/g. The capacity density of the titanium oxide, accordingly, is remarkably lower than that of the carbon negative electrode material. This can be caused due to the small number of sites for inserting lithium in the crystal structure of the titanium oxide, or a decrease in the substantial capacity because lithium is easily stabilized in the structure.

In view of the above, a novel electrode material containing Ti and Nb is studied, in particular, a monoclinic Nb—Ti composite oxide, represented by $TiNb_2O_7$, is receiving attention because charge compensation, in which tetravalent Ti is turned into trivalent Ti, and pentavalent Nb is turned into trivalent Nb, is caused upon the Li insertion, and thus a high theoretical capacity such as 387 mAh/g can be obtained.

BRIEF DESCRIPTION OF THE DRAWINGS

FIG. 12 is a block diagram showing an electric circuit of the battery pack in FIG. 11;

FIG. 15 is a partially enlarged view of the photograph of FIG. 13;

FIG. 16 is a view in which a line segment RS is drawn on the photograph of FIG. 15;

FIG. 19 shows an element concentration mapping of the active material for a battery from Example 1.

DETAILED DESCRIPTION

Figure 1:
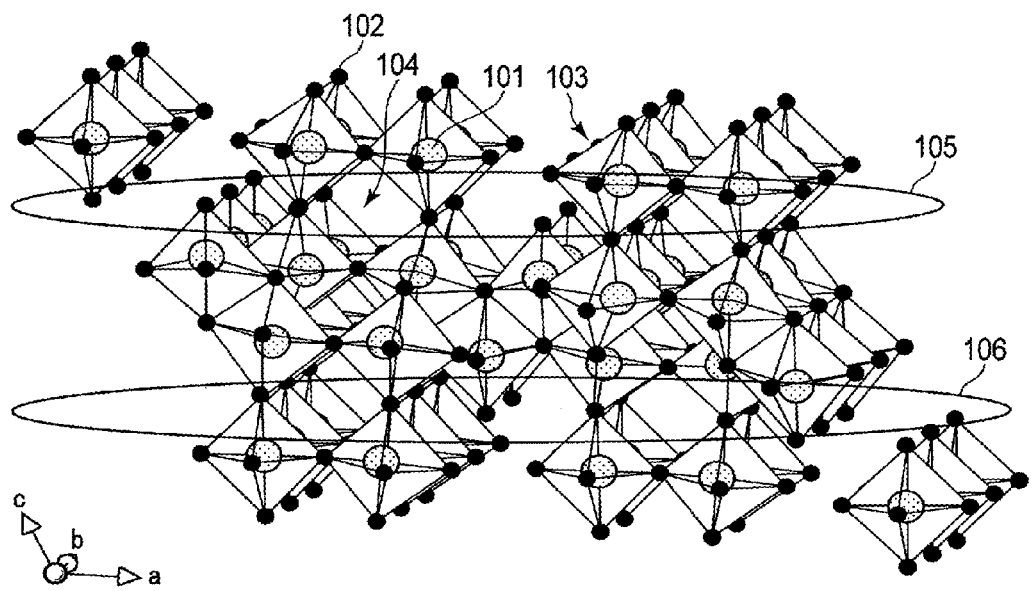
FIG. 1 is a schematic view showing a crystal structure of a monoclinic $TiNb_2O_7$.

According to a first embodiment, an active material is provided. The active material for a battery includes active material particles. The active material particle includes a core particle and a shell layer which covers at least a part of a surface of the core particle. The core particle contains a monoclinic or orthorhombic niobium-titanium composite oxide. The shell layer contains a compound which is at least one compound selected from the group consisting of a lithium-titanium composite oxide, an Nb-containing lithium-titanium composite oxide, a lithium-niobium composite oxide, a lithium phosphate, and an Nb-containing lithium phosphate. The compound has a composition different from that of the monoclinic or orthorhombic niobium-titanium composite oxide.

According to a second embodiment, a nonaqueous electrolyte battery is provided. The nonaqueous electrolyte battery includes a negative electrode, a positive electrode, and a nonaqueous electrolyte. The negative electrode includes the active material according to the first embodiment.

According to a third embodiment, a battery pack including the nonaqueous electrolyte battery according to the second embodiment is provided.

According to a fourth embodiment, a vehicle is provided. The vehicle includes the battery pack according to the third embodiment.

Embodiments are explained below referring to drawings. In the following descriptions, the same reference number is applied to structural features having the same or similar function throughout all drawings, and overlapped explanations are omitted. Each drawing is a schematic view for explaining the embodiment and promoting the understanding thereof. Shapes, sizes and ratios in the drawing, accordingly, may be different from those in a practical apparatus, but they may be appropriately designed and changed considering the following descriptions and known technology.

First Embodiment

According to the first embodiment, an active material for a battery is provided. The active material for a battery includes active material particles. The active material particle includes a core particle, and a shell layer which covers at least a part of a surface of the core particle. The core particle contains a monoclinic or orthorhombic niobium-titanium composite oxide. The shell layer contains a compound which is at least one compound selected from the group consisting of a lithium-titanium composite oxide, an Nb-containing lithium-titanium composite oxide, a lithium-niobium composite oxide, a lithium phosphate, and an Nb-containing lithium phosphate. The compound has a composition different from that of the monoclinic or orthorhombic niobium-titanium composite oxide.

The active material for a battery according to the first embodiment containing active material particles containing the core particle containing the monoclinic or orthorhombic niobium-titanium composite oxide can realize a nonaqueous electrolyte battery capable of showing a high capacity. Referring to the drawings, the reasons therefor are explained below.

Figure 2:
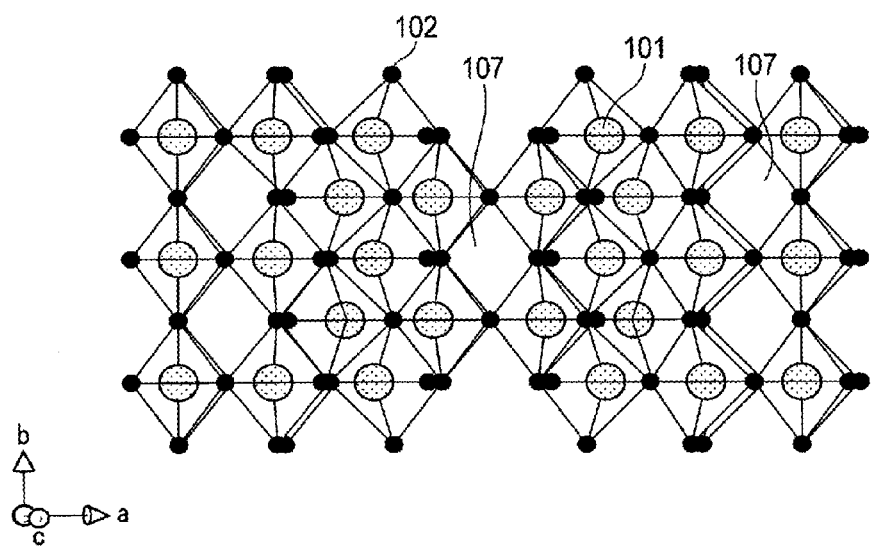
FIG. 2 is a schematic view showing the crystal structure of FIG. 1 when viewed from another direction.

FIG. 1 is a schematic view showing a crystal structure of a monoclinic $TiNb_2O_7$, which is one example of a monoclinic niobium-titanium composite oxide. FIG. 2 is a schematic view showing the crystal structure of FIG. 1 when viewed from another direction.

As shown in FIG. 1, in the crystal structure of the monoclinic $TiNb_2O_7$, metal ions 101 and oxide ions 102 form framework structure parts 103. In the metal ion 101, Nb ions and Ti ions are randomly arranged in a ratio of Nb:Ti=2:1. As the framework structure parts 103 are three-dimensionally alternatively arranged, there are space parts 104 between the framework structure parts 103, as shown in FIG. 1. This space part 104 is a host of a lithium ion. The space parts 104 can occupy a large part of the whole crystal structure, as shown in FIG. 1. In addition, the space part 104 can stably keep the structure even if the lithium ions are inserted.

When the lithium ions are inserted in the space parts 104, the metal ions 101, forming the framework structure parts 103, are reduced to trivalent ions, whereby the electrical neutrality of the crystal can be kept. In the monoclinic niobium-titanium composite oxide $TiNb_2O_7$, not only tetravalent Ti ions are reduced into trivalent ions, but also pentavalent Nb ions are reduced into trivalent ions. Owing to this, the monoclinic composite oxide $TiNb_2O_7$ has a reduction valence per mass of the active material larger than that of a compound containing Ti ions, which is a tetravalent cation, alone. As a result, in the monoclinic composite oxide $TiNb_2O_7$, even if more lithium ions are inserted, it is possible to keep the electrical neutrality of the crystal. As described above, the monoclinic composite oxide $TiNb_2O_7$ can more increase an energy density compared to a compound containing only a tetravalent cation such as titanium oxide, because more lithium ions can be inserted in the monoclinic composite oxide.

The monoclinic composite oxide $TiNb_2O_7$ having the crystal structure shown in FIG. 1 and FIG. 2, has multiple areas having a two-dimensional channel in which lithium diffuses quickly and lithium pathways connecting the areas. Specifically, in FIG. 1, an area 105 and an area 106 are parts having a two-dimensional channel in a direction [100] and a direction [010] respectively. As shown in FIG. 2, in the crystal structure of the monoclinic composite oxide $TiNb_2O_7$, there are space parts 107 in a direction [001]. The space part 107 has a tunnel structure which is advantageous to lithium ion conduction, which is a lithium pathway connecting the area 105 to the area 106 in the direction [001]. The lithium ions can go and return between the area 105 and the area 106 by the presence of the lithium pathway 107.

As described above, in the crystal structure of the monoclinic composite oxide $TiNb_2O_7$, equivalent space in which lithium ions can be inserted is large and structurally stable. In addition, the monoclinic composite oxide $TiNb_2O_7$ can more increase the energy density compared to a compound containing no pentavalent cation. Further, in the crystal structure of the monoclinic composite oxide $TiNb_2O_7$, there are areas 105 and 106 having two-dimensional channel in which lithium ions diffuse quickly, and the lithium pathways 107 connecting them in the direction [001], and thus the monoclinic composite oxide described above can improve the capacity of inserting lithium ions in space in which lithium ions can be inserted and the capacity of extracting lithium ions from the space, and can effectively increase a space capable of contributing to the insertion and extraction of the lithium ions. As a result, the monoclinic composite oxide $TiNb_2O_7$ can provide a high capacity. Specifically, the monoclinic composite oxide $TiNb_2O_7$ has a theoretical capacity of about 387 mAh/g, which is twice or more that of titanium oxide having a spinel structure.

A composite oxide similar to the monoclinic composite oxide $TiNb_2O_7$ may include, for example, monoclinic $Nb_{24}TiO_{62}$, monoclinic $Nb_{14}TiO_{37}$, and orthorhombic $Nb_{10}Ti_2O_{29}$. These are called a Wedsley-Roth phase, which has a structure in which, in an octahedron coordinate structure formed from oxygen element and a metal element, octahedron blocks, which are linked by sharing apexes, are linked by sharing rhombohedral faces of the octahedron, or entering a tetrahedron formed of oxygen and a metal element to form plain faces, and the resulting plane faces are laminated in one axial direction. As described above, they have a similar crystal structure, and thus a space into which Li is inserted is large and a high capacity can be realized.

The monoclinic or orthorhombic niobium-titanium composite oxide, accordingly, can realize a high capacity.

The niobium-titanium composite oxide can show improved electric conductivity by covering a carbon material. The carbon material, however, shows a high electron conductivity regardless of the state-of-charge. In addition, the niobium-titanium composite oxide can exhibit a high electron conductivity when Li is inserted in it. For those reasons, an active material containing the niobium-titanium composite oxide particles and the carbon material covered with them has a high electrical continuity in a high state-of-charge. Thus, in a nonaqueous electrolyte battery having an electrode containing such an active material, a short circuit current continues to flow when a short-circuit occurs between an electrode in a high state-of-charge and a counter electrode, whereby heat can be generated.

On the other hand, the shell layer of the active material particles contained in the active material for a battery according to the first embodiment can suppress conduction of a short-circuit current when a short-circuit occurs between the electrode and the counter electrode in a nonaqueous electrolyte battery having an electrode containing the active material, leading to prevention of the occurrence of heat generation. The active material for a battery according to the first embodiment, accordingly, can realize a nonaqueous electrolyte battery having more excellent safety than that of the active material containing the niobium-titanium composite oxide particles and the carbon material layer covered with them.

As described above, the active material for a battery according to the first embodiment can realize a nonaqueous electrolyte battery capable of high capacity and excellent safety.

In the active material particles contained in the active material for a battery according to the first embodiment, the compound contained in the shell layer can show a lower reactivity with the nonaqueous electrolyte than that of the monoclinic or orthorhombic niobium-titanium composite oxide. For that reason, in the active material for a battery according to the first embodiment, the shell layer contained in the active material particle can suppress an interfacial reaction between the part of the core particle surface, covered with the shell layer, and the nonaqueous electrolyte. In the active material for a battery according to the first embodiment, accordingly, the shell layer contained in the active material can suppress a side reaction which occurs at an interface between the nonaqueous electrolyte and the active material particle, whereby the nonaqueous electrolyte battery containing the active material for a battery according to the first embodiment can prevent an increased resistance associated with cycles; as a result, an excellent life time characteristic can be exhibited.

Next, the active material for a battery according to the first embodiment is explained in more detail.

The active material for a battery according to the first embodiment contains active material particles. The active material particle contains a core particle and a shell layer which covers at least a part of a surface of the core particle. The shape of the core particle is not particularly limited.

For example, the core particles may be primary particles or secondary particles which are primary particle aggregates. The primary particle of the core particle can have an aspect ratio of, for example, 1.0 to less than 4.0. The primary particles of the core particle may be fibrous particles.

The core particle contains a monoclinic or orthorhombic niobium-titanium composite oxide.

The monoclinic niobium-titanium composite oxide may include, for example, a monoclinic composite oxide represented by a composition formula: $Nb_2TiO_7$, $Nb_{24}TiO_{62}$ or $Nb_{14}TiO_{37}$. The orthorhombic niobium-titanium composite oxide may include, for example, an orthorhombic composite oxide represented by a composition formula: $Nb_{10}Ti_2O_{29}$.

An element ratio of Nb/Ti in the core particle is preferably $1.5 \leq Nb/Ti < 2.5$.

The shell layer of the active material particle contains a compound which is at least one compound selected from the group consisting of a lithium-titanium composite oxide, an Nb-containing lithium-titanium composite oxide, a lithium-niobium composite oxide, a lithium phosphate, and an Nb-containing lithium phosphate and the compound has a composition different from that of the niobium-titanium composite oxide contained in the core particle.

One example of the lithium-titanium composite oxide is lithium titanate having a cubic, more specifically a spinel type crystal structure. The lithium titanate having the spinel type crystal structure may represented, for example by a composition formula: $Li_{4+\delta}Ti_5O_{12}$ ($0 \leq \delta \leq 3$). The insertion and extraction reaction of Li in the material is a two-phase concomitant reaction, which proceeds changing from $Li_4Ti_5O_{12}$ to $Li_7Ti_5O_{12}$. The spinel type lithium titanate in the state represented by $Li_7Ti_5O_{12}$ can show high electric conductivity. On the other hand, the spinel type lithium titanate in the state represented by $Li_4Ti_5O_{12}$ can show insulation. The active material particles containing such a material as the shell layer can show electric conductivity in a high state-of-charge and can show insulation in a low state-of-charge. For example, when a short-circuit occurs between the electrode containing the active material for a battery of the aspect in which the shell layer contains the lithium-titanium composite oxide, and the counter electrode thereof, the state-of-charge of the shell layer of the active material particle is steeply decreased, whereby the shell layer of the active material particles can serve as an insulator suppressing electron conduction. Owing to this, the nonaqueous electrolyte battery having an electrode containing such an active material for a battery can prevent electrical continuity upon a short-circuit, and thus it is possible to prevent heat generation and show excellent safety.

In addition, in the lithium-titanium composite oxide, the electron conductivity is smaller than that of the niobium-titanium composite oxide of the core particle when Li is inserted. For that reason, the shell containing the lithium-titanium composite oxide can suppress a side reaction between the niobium-titanium composite oxide contained in the core particle and the nonaqueous electrolyte.

The lithium-titanium composite oxide can further contain Nb; in other words, the shell layer can contain an Nb-containing lithium-titanium composite oxide. The Nb-containing lithium-titanium composite oxide has preferably an Nb content of 20 atm % or less. The Nb-containing lithium-titanium composite oxide having an Nb content of 20 atm % or less may include, for example a composite oxide having a tetragonal type crystal structure represented by the general formula: $Li_xNb_{3x}Ti_{1-4x}O_2$ wherein $0 \leq x \leq 0.25$. The composite oxide can have an electron conductivity when Li is inserted. On the other hand, Li ions are inserted in the composite oxide cannot escape therefrom but some remain even in the complete state-of-discharge due to the restriction of the crystal structure, and thus electron conductivity is maintained. The Nb-containing lithium-titanium composite oxide, however, can serve as an insulator in a low state-of-charge. For that reason, when a short-circuit occurs between the electrode containing the active material for a battery of the aspect in which the shell layer contains the Nb-containing lithium-titanium composite oxide, and the counter electrode thereof, the state-of-charge of the shell layer of the active material particle is steeply decreased, whereby the layer can serve as an insulator suppressing electron conduction.

The Nb-containing lithium-titanium composite oxide more preferably has an Nb content within a range of 1 atm % to 18 atm %, still more preferably within a range of 10 atm % to 18 atm %.

The lithium-niobium composite oxide may include, for example, a composite oxide having a trigonal type crystal structure represented by a composition formula: $LiNbO_3$. The lithium-niobium composite oxide can further contain Ti. The lithium-niobium composite oxide preferably has a Ti content of 0 atm % to 8 atm %, more preferably 0 atm to 4 atm %. The lithium phosphate may include, for example, lithium phosphate having a monoclinic crystal structure represented by a composition formula: $Li_3PO_4$, and nitrogen-containing lithium phosphate having a monoclinic crystal structure represented by the composition formula: $Li_3PO_4N$.

The lithium-niobium composite oxide represented by the composition formula: $LiNbO_3$ and the lithium phosphate represented by the composition formula: $Li_3PO_4$ and the composition formula $Li_3PO_4N$ can be a solid electrolyte showing Li ion conductivity. The shell layer containing the lithium-niobium composite oxide or the lithium phosphate can suppress electron conductivity of the active material particles in a high state-of-charge, and thus it can suppress conduction of a short-circuit current upon a short-circuit. As a result, such a shell layer can prevent heat generation owing to electric conductivity of the niobium-titanium composite oxide.

Further, the shell layer containing the lithium-niobium composite oxide or the lithium phosphate can show reactivity against a nonaqueous electrolyte lower than that of the core particle containing the niobium-titanium composite oxide. For that reason, the shell layer containing the lithium-niobium composite oxide or the lithium phosphate can further prevent increased resistance associated with cycles; as a result, an excellent life time characteristic can be realized.

The lithium phosphate can further contain Nb; in other words, the shell layer of the particle of the active material for a battery according to the first embodiment can contain an Nb-containing lithium phosphate. The Nb-containing lithium phosphate preferably has an Nb content of 18 atm % or less. The Nb-containing lithium phosphate more preferably has an Nb content within a range of 0 atm % to 18 atm %, still more preferably within a range of 0 atm % to 10 atm %.

The shell layer may contain the compounds described above alone or a mixture of multiple kinds thereof.

For example, a shell layer, in which the Nb-containing lithium-titanium composite oxide and the lithium-niobium composite oxide (for example, $LiNbO_3$) having the trigonal type crystal structure exist as a mixed phase, can have a good balance between electron conductivity and Li ion conductivity; as a result, it is possible to attain an improvement of the life time characteristic without impairing the rate characteristic.

The compound contained in the shell layer does not have the crystal structure as described above, but may have a state close to an amorphous state. In the active material for a battery according to the first embodiment, accordingly, the shell layer may have an amorphous structure. In the active material for a battery according to the first embodiment, even if the shell layer contains an amorphous structure, conduction of a short-circuit current can be prevented upon a short-circuit. On the other hand, when the shell layer contains the crystalline compound described above, it can show a more excellent Li ion diffusibility.

The shell layer preferably contains a compound containing an Nb element. In addition, in the shell layer, it is preferable that an atomic concentration of the Nb element is gradually decreased toward the particle surface from the contact point of the core particle. Such a structure can be formed, for example, by diffusion bonding of the shell layer and the niobium-titanium composite oxide particles of the core particle. When the shell layer is bonded to the core particle in the state described above, a diffusion resistance can be suppressed when Li is inserted the active material.

Although it is sufficient if the shell layer covers at least a part of the surface of the core particle, it may cover the whole surface of the core particle. The shell layer, which covers the whole surface of the core particle can suppress an interfacial reaction between the composite oxide contained in the core particle and the nonaqueous electrolyte. For this reason, an active material in which the shell layer of the active material particle covers the whole surface of the core particle, among the active materials for a battery according to the first embodiment, can realize a nonaqueous electrolyte battery capable of showing a more excellent life time characteristic. The shell layer, which covers the whole surface of the core particle, can suppress a variation in volume of the composite oxide contained in the core particle. For that reason, the active material in which the shell layer of the active material particle covers the whole surface of the core particle, among the active materials for a battery according to the first embodiment, can realize a nonaqueous electrolyte battery capable of showing a more excellent life time characteristic. The active material particles according to the first embodiment may be in a shape of a primary particle, a shape of a secondary particle in which the primary particles are aggregated, or a mixture of primary particles and secondary particles. For example, the active material particles according to the first embodiment can contain primary particles, which are the core particles containing the monoclinic or orthorhombic niobium-titanium composite oxide, and a shell layer, which covers at least apart of the surface of the primary particle. Alternatively, the active material particles according to the first embodiment may also contain secondary particles, which are the core particle in which primary particles containing the monoclinic or orthorhombic niobium-titanium composite oxide are aggregated, and a shell layer, which covers at least a part of the surface of the secondary particle. Alternatively, the active material particles according to the first embodiment may also contain primary particles containing the core particle containing the monoclinic or orthorhombic niobium-titanium composite oxide and a shell layer which covers at least a part of the surface of the core particle, and secondary particle in which the primary particles described above are aggregated.

It is preferable to adjust the average primary particle size of the active material particles to a range of, for example, 0.5 µm to 2 µm. The active material for a battery having an average primary particle size of the active material particles within the range described above has good Li ion diffusibility in the solid of the active material particles, and thus it is excellent as the negative electrode material. A more preferable average primary particle size is within a range of 0.5 µm to 1.5 µm. The active material particles preferably have an average secondary particle size within a range of, for example 5 µm to 30 µm. When the average secondary particle size of the active material particles is within the range described above, a problem of cut foil caused by inclusion of coarse particles does not occur in an electrode production process in which slurry is prepared and is coated on a current collecting foil. A more preferable average secondary particle size is within a range of 5 µm to 15 µm.

The core particles of the active material particles preferably have an average primary particle size within a range of 0.5 µm to 3 µm. When the shell layer is formed, for example, according to rolling fluidized bed granulation, a fluidized bed can be formed without defects by using the particles having such a primary particle size, whereby a thickness of the shell layer can be made more uniform. When the thickness of the shell layer is more uniform, the occurrence of deviation of state-of-charge in the core particle can be prevented, and eventually a more excellent life time characteristic can be realized. The particle size is more preferably within a range of 0.5 µm to 2 µm.

In a case in which the active material particles contain secondary particles in which primary particles containing monoclinic or orthorhombic niobium-titanium composite oxide are aggregated as the core particles, the secondary particles preferably have an average secondary particle size within a range of, for example, 5 µm to 30 µm. When the average secondary particle size of the secondary particles as the core particle is within the range described above, a problem of cut foil caused by inclusion of coarse particles does not occur in an electrode production process in which slurry is prepared and is coated on a current collecting foil. A more preferable average secondary particle size of the secondary particles as the core particle is within a range of 5 µm to 15 µm.

It is preferable that a thickness of the shell layer corresponds to a range of 0.1% to 30% of the average particle size of the core particles. When the thickness of the shell layer is within the range described above, there is an effect of suppressing a side reaction upon the cycle, and the diffusion of Li ions to the core particle is not impaired. The thickness of the shell layer is more preferably within a range of 0.1% to 20%.

The active material particles contained in the active material for a battery according to the first embodiment preferably contain the shell layer in a content of 0.1% to 15% by mass relative to the mass of the active material particles. When the shell layer is contained in a content of 0.1% to 15% by mass relative to the mass of the active material particles, suppression of a side reaction is effective upon the cycle, and decreased energy density, caused by an increase of the weight when the nonaqueous electrolyte battery is constructed can be suppressed. The shell layer is more preferably contained in a content of 1% to 10% by mass relative to the mass of the active material particles.

The BET specific surface area of the active material particles is not particularly limited, and is preferably within a range of 1 $m^2/g$ to 30 $m^2/g$. The BET specific surface area of the active material particles within the range described above can provide a contact area preferable for both of the battery characteristics and the life time characteristic, and enables to easily perform the electrode coating in the production steps. Analysis of the specific surface area is performed using a method in which a molecule whose adsorption occupancy area is known is adsorbed on the surface of a powder particle at a temperature of liquid nitrogen, and a specific surface area of a sample is obtained from the adsorption amount. A method most often utilized is a BET method, which is based on physical adsorption at a low temperature and low humidity of an inert gas. This method is the most popular theory as a calculation method of the specific surface area, in which the Langmuir theory, which is a monomolecular layer adsorption theory, is expanded to a multi-molecular layer adsorption theory. In the instant specification, the specific surface area obtained by the BET method is called the "BET specific surface area."

<Production Method>

The active material for a battery according to the first embodiment can be produced, for example, according to the following method.

First, particles containing the monoclinic or orthorhombic niobium-titanium composite oxide are prepared as the core particles.

Next, the shell layer is formed on at least a part of the surface of the core particle. Such a shell layer can be produced, for example, by rolling fluidized bed granulation. Rolling fluidized bed granulation refers to a method in which a fluidized bed of a powder is produced utilizing an air flow, to which a solution is sprayed to produce a coating or particles on the surface of the particle.

Powder physical properties of the active material particles, produced by rolling fluidized bed granulation, such as a particle size distribution, and a covering amount and a covering state (the shell layer covers the whole or a part of the surface of the core particle) of the shell layer, can be controlled by adjusting the kind of a solution, a solid ratio, a spray speed, and a drying temperature in the rolling fluidized bed granulation.

Starting materials of the solution for the shell layer are not particularly limited. As a Ti source, for example, titanium tetraisopropoxide, titanyl sulfate, or the like may be used. As an Li source, for example, lithium alkoxide, lithium acetate, lithium hydroxide, or the like may be used. As an Nb source, for example, niobium hydroxide, niobium ethoxide, niobium chloride, or the like may be used. As a P source, for example, phosphoric acid, ammonium phosphate, or the like may be used.

Next, the particles having the shell layer formed on a part of the surface of the core using the rolling fluidized bed granulation are fired in an air atmosphere or an oxygen atmosphere, whereby the crystallinity of the shell layer can be increased. The firing temperature may be from 400° C. to 700° C. When the firing temperature is lower than 400° C., an organic component in the solution sprayed remains on the shell layer, whereby a side reaction may sometimes be caused during the cycle. When the firing temperature is higher than 700° C., the core particles contained in the niobium-titanium composite oxide particles react with the Li source contained in the shell layer, whereby a large amount of a heterogenous phase may possibly be formed.

The active material for a battery according to the first embodiment can be obtained by this firing. The compound of the shell layer of the active material particles contained in the active material for a battery according to the first embodiment may have a structure close to an amorphous structure, depending on the production method.

Next, some specific examples of the active material for a battery according to the first embodiment are explained referring to the drawings.

Figure 3:
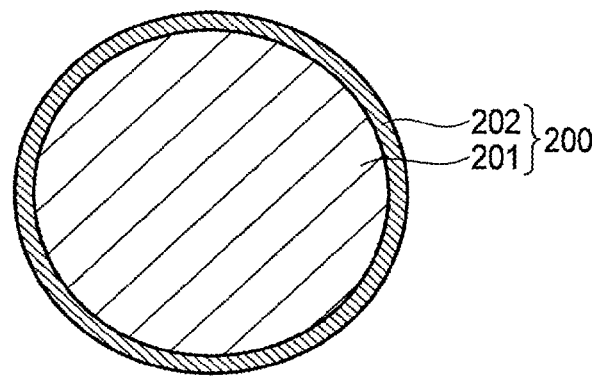
FIG. 3 is a cross-sectional outline view showing a first example of an active material for a battery according to a first embodiment.
Figure 4:
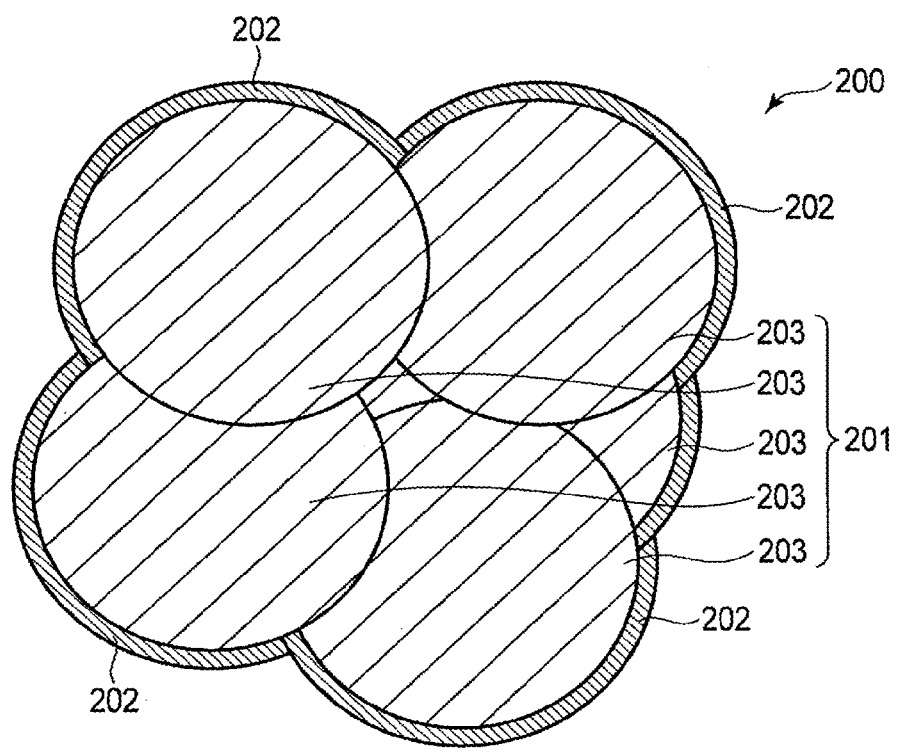
FIG. 4 is a cross-sectional outline view showing a second example of the active material for a battery according to the first embodiment.
Figure 5:
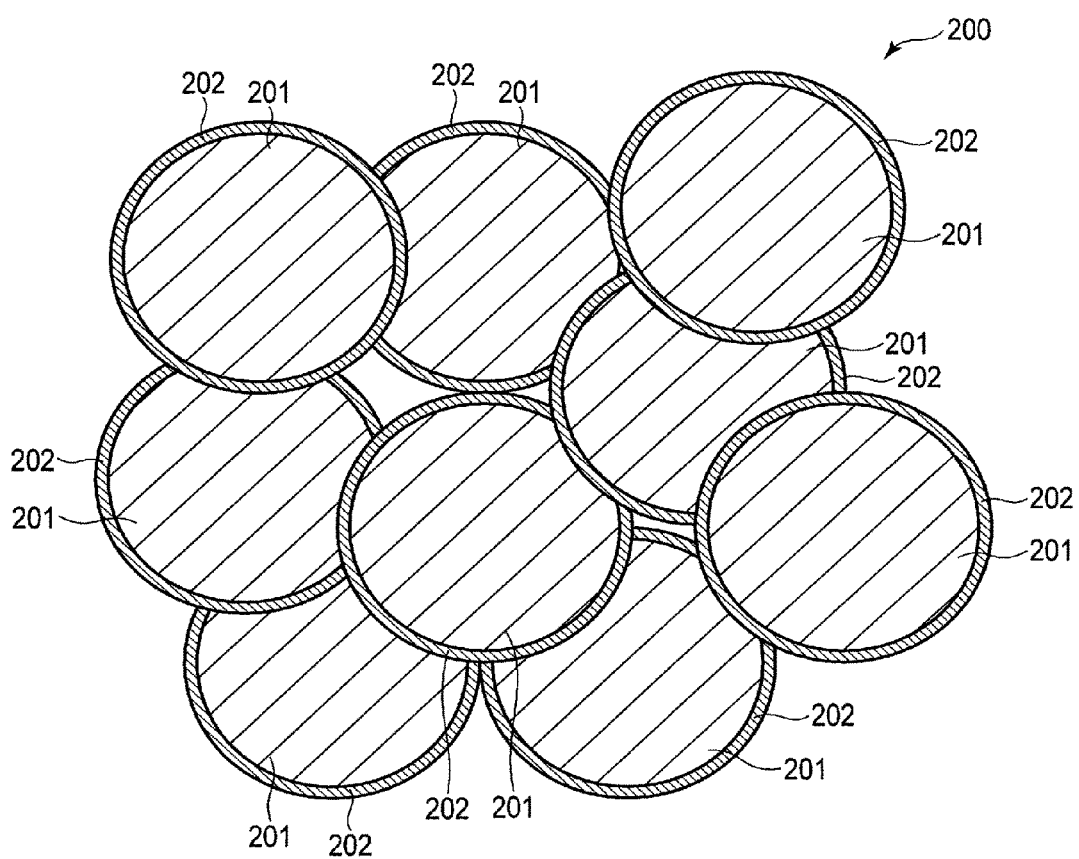
FIG. 5 is a cross-sectional outline view showing a third example of the active material for a battery according to the first embodiment.

FIG. 3 is a cross-sectional outline view showing a first example of the active material for a battery according to the first embodiment. FIG. 4 is a cross-sectional outline view showing a second example of the active material for a battery according to the first embodiment. FIG. 5 is a cross-sectional outline view showing a third example of the active material for a battery according to the first embodiment.

An active material for a battery 200 of the first example shown in FIG. 3 contains a core particle 201 containing a monoclinic or orthorhombic niobium-titanium composite oxide, and a shell layer 202 covering the whole surface of the core particle. The shell layer 202 contains at least one oxide selected from the group consisting of a lithium-titanium composite oxide, an Nb-containing lithium-titanium composite oxide, a lithium-niobium composite oxide, a lithium phosphate, and an Nb-containing lithium phosphate.

An active material for a battery 200 of the second example shown in FIG. 4 contains multiple primary particles 203, each primary particle containing a monoclinic or orthorhombic niobium-titanium composite oxide. The primary particles 203 are aggregated, and the core particle 201 is formed as a secondary particle. An active material for a battery 200 shown in FIG. 4 further contains a shell layer 202 covering the whole surface of the core particle 201. The shell layer 202 contains at least one oxide selected from the group consisting of a lithium-titanium composite oxide, an Nb-containing lithium-titanium composite oxide, a lithium-niobium composite oxide, a lithium phosphate, and an Nb-containing lithium phosphate.

An active material for a battery 200 of the third example shown in FIG. 5 has the shape of a secondary particle in which multiple particles of the active material for a battery 100 of the first example shown in FIG. 3 are aggregated.

In FIG. 3 to FIG. 5, in order to clarify the presence of the shell layer 202, the thickness of the shell layer 202 is exaggerated. In actual fact, however, the thickness of the shell layer 202 can be extremely thin compared to the particle size of the core particle 201.

<Various Methods of Measuring Active Material for Battery>

Next, methods for measuring a composition, a structure, and a particle size of the active material for a battery are explained.

(Pre-Treatment)

The powder of the active material for a battery can be subjected to each measurement after the powder is adjusted in a generally known pre-treatment method.

On the other hand, when measurement of the active material for a battery incorporated in the battery is performed, the active material for a battery is taken out from the battery as follows:

First, in order to know a crystal condition of the active material particles contained in the active material for a battery, lithium ions are completely extracted from the niobium-titanium composite oxide. For example, when measurement of the active material particles contained in the negative electrode is performed, the battery is put into a complete state-of-discharge. However, even in the state-of-discharge, a slight amount of lithium ions may remain.

Next, the battery is disassembled in a glove box filled with argon, and an electrode containing an active material to be measured is taken out. Then, the electrode taken out is washed with an appropriate solvent. It is preferable to use a nonaqueous solvent of the nonaqueous electrolyte such as ethyl methyl carbonate as the solvent used here, when the battery is a nonaqueous electrolyte battery.

Next, the electrode taken out is appropriately cut, immersed in a solvent (organic solvents such as alcohols and NMP are preferable), and applied with ultrasonic waves. In this way, the electrode material layer can be removed from the current collecting foil. Next, the electrode material layer removed is put in a solvent, and the resulting dispersion is treated using a centrifugal separator. In this way, it is possible to separate the active material alone from the powder of the electrode material layer containing the conductive agent such as carbon. Alternatively, when there are materials other than the electrode material layer (carbon, a current collector, a binder, and the like) in advance, a powder from which the above components are removed is prepared and a pre-measurement thereof is performed, and the result thereof is excluded from a measurement result.

<Distinction of Core Particle and Shell Layer>

Based on transmission electron microscope (TEM) observation, a distribution of each crystal can be confirmed in a material having a mixed phase.

When transmission electron microscope observation is performed, it is desirable that a sample powder to be measured is embedded in a resin or the like, and the inside of the sample is milled by mechanical polishing or ion milling. Even if the sample to be measure is an electrode body, the same treatment as above can be performed. For example, an electrode body is embedded in a resin as it is, and a desired part thereof can be observed, or a current collector (a metal foil) is removed from the electrode body, and the resulting product can be observed as an electrode powder in which a conducting material and binder are mixed. In this way, how the two crystal phases are distributed in the primary particle can be known, and an inclination of a composition in the particle can be known.

In particular, the core particle and the shell layer can be distinguished by transmission electron microscope (TEM) observation. In TEM observation, it is preferable to use an image of a high-angle annular dark field scanning transmission electron microscope (HAADF-STEM). HAADF-STEM refers to a method in which observation is performed by detecting transmitted electrons scattered on a high angle side, from which a contrast directly proportional to an atomic weight can be obtained. In the active material particles contained in the active material for a battery according to the first embodiment, the core particle containing the niobium-titanium composite oxide can contain Nb element in a larger amount than that in the shell layer. For such reason, in the HAADF-STEM image of the active material for a battery according to the first embodiment, the core particles can be observed darker compared to the shell layer, whereby the shell layer can be clearly distinguished from the core particles from a difference in the contrast.

Figure 6:
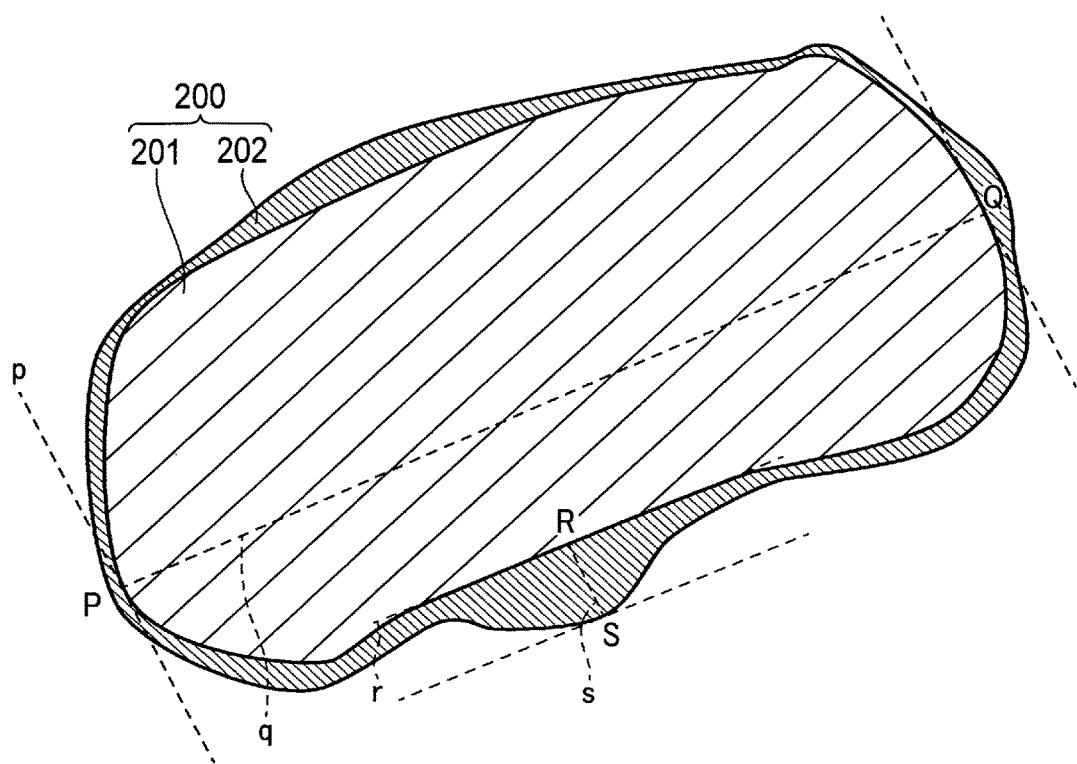
FIG. 6 is a cross-sectional outline view showing a further example of the active material for the battery according to the first embodiment.

Next, referring to FIG. 6, methods for measuring a particle size of the core particles and a thickness of the shell are described.

FIG. 6 is a cross-sectional outline view showing a further example of the active material for the battery according to the first embodiment.

First, an arbitrary primary particle is selected from TEM observation images. Next, the selected particle is subjected to HAADF-STEM observation. In the HAADF-STEM image obtained, the core particle is distinguished from the shell layer based on the contrast.

FIG. 6 is a schematic view in which the core particle is distinguished from the shell layer in the HAADF-STEM image of the active material of the further example of the active material for a battery according to the first embodiment.

The particle size of the core particle is calculated as follows: First, as one example, as shown in FIG. 6, one point on the surface of the core particle 201 is set as a point of contact P. Next, a tangential line p is drawn against a point of contact P. Next, a line q orthogonal to the tangential line p is drawn toward the point of contact P. A point intersecting the line q on the core particle 201, other than the point P, is set as a point Q. The same core particle 201 is subjected to the same procedures as above, and the longest distance PQ on the core particle 201 is defined as a particle size of the core particle 201. The same method applies to 10 arbitrary particles, observed in the TEM image, and an average value thereof is calculated as the average particle size of the core particle 201.

The thickness of the shell layer is calculated as follows: First, one point on the surface of the core particle 201 is set as a point of contact R. Next, a tangential line r is drawn against a point of contact R. A line s perpendicular to the tangential line r of the point R is drawn. A point at which the line s intersects the outermost part on the shell layer 202 is set as a point S. The same primary particle is subjected to the same procedures as above, and the longest distance RS on the core particle is defined as a thickness of the shell layer 202. Further, a ratio of the thickness of the shell layer 202 to the particle size of the core particle 201 is calculated as Distance RS/Distance PQ (unit: %). The same method applies to 10 arbitrary particles, observed in the TEM image, and an average value thereof is calculated as the ratio of the thickness of the shell layer to the average particle size of the core particle (unit: %).

<Powder X-ray Diffraction Measurement of Active Material for Battery>

The powder X-ray diffraction measurement of the active material for a battery can be performed, for example, as follows:

First, a target sample is pulverized in a mortar. It is preferable to perform the pulverization over at least one hour until the average particle size does not vary. The sample pulverized is put in a holder part having a depth of 0.2 mm, formed on a glass sample plate. At that time, care should be taken so that a sufficient amount of the sample is put in the holder. Care should also be taken so that a proper amount of the sample is put therein, without generating cracks or cavities.

Subsequently, the holder is pressed with another glass plate from the outside, to smoothen the surface of the sample put in the holder. Care should be taken so that unevenness is not generated from a reference surface of the holder due to excessive or insufficient sample quantity.

Next, the glass plate holding the sample is put in a powder X-ray diffraction apparatus, and a diffraction pattern is obtained using Cu-Kα rays.

The orientation of the particles may become high depending on the particle shape of the sample. When the orientation of the sample is high, the position of the peak may sometimes be shifted or the intensity ratio may sometimes be changed depending on the way to put the sample. Such a sample having a remarkably high orientation is measured using a glass capillary. Specifically, the sample is inserted into a capillary, the capillary is put on a rotary sample stand, and measurement is performed. The orientation can be lessened by the measurement method described above. As the glass capillary, it is preferable to use a capillary made of Lindemann glass, having a diameter of 1 mm to 6 mm cp.

The powder X-ray diffraction measurement of the active material contained in the electrode can be performed, for example, by the following method.

First, the battery is made into a complete state-of-discharge, as described above. Next, the battery is disassembled, and the electrode is taken out therefrom and is washed with an appropriate solvent such as ethylmethyl carbonate, as described above. Here, if the electrode is insufficiently washed, impurity phases such as lithium carbonate or lithium fluoride may be contained due to the influence of lithium ions remaining in the electrode. In such a case, an air-tight container by which measurement can be performed in an inert gas atmosphere is preferable. The washed electrode is cut into a size which is almost the same area of the holder in the powder X-ray diffraction apparatus, which is used as a sample for measurement. The measurement is performed by directly sticking the sample to the glass holder. At that time, a peak corresponding to a metal of a metal foil contained in an electrode substrate is previously measured using XRD, and a peak position resulting from the electrode substrate is found. In addition, peaks of other components such as a conductive assistant and a binder are previously measured and found in the same manner as above. When the peak of the substrate material overlaps the peak of the active material, it is desirable to perform measurement after the active material is removed from the substrate, in order to separate such overlapping peaks when the peak intensity is quantitatively measured. The operation can be, of course, omitted if these are known in advance. The electrode may be physically removed, but it is more easily removed by application of ultrasonic waves in a solvent. When the active material is removed from the substrate by the ultrasonic wave treatment, the solvent is evaporated, whereby the electrode powder (including the active material, the conductive assistant, and the binder) can be recovered. The recovered electrode powder is put, for example, in a Lindemann glass capillary, and measurement is performed, whereby the powder X-ray diffraction measurement of the active material can be performed. The electrode body powder, recovered using the ultrasonic wave treatment, can be subjected to various analyses other than powder X-ray diffraction measurement.

<Determination of Composition Ratio>

A composition of the active material for a battery and a content of elements contained in the active material can be identified by the combination of the TEM observation described above and energy dispersive X-ray spectroscopy (EDX) measurement, an X-ray photoelectron spectroscopy (XPS) analysis, inductively coupled plasma (ICP) emission spectroscopy, and inert gas fusion-infrared absorption.

The element concentrations of the shell layer and the core particle of the active material particle can be obtained by a calculation obtained from information of a spectrum, the spectrum being obtained from each element by EDX analysis. The TEM observation and EDX analysis are performed according to STEM-EDX analysis, for example, in the following conditions. The element concentration information can be obtained according to a method provided by analytical software.

STEM-EDX Analysis Conditions
Sample Making Method: Mechanical Polishing+Ion Milling Method
Ion Milling Apparatus: Dual Mill 600 manufactured by GATAN Inc.
TEM: JEM-ARM 200F manufactured by JEOL Ltd.
EDX: JED-2300 manufactured by JEOL Ltd.
Detector: SDD (Silicon Drift Detector)
Analysis System: Analysis Station
Acceleration Voltage: 200 kV
Beam Diameter: 0.2 nm φ
Measurement Time: 15 seconds or more The element concentration is obtained by calculating atomic concentrations at 10 points at 2 nm intervals from a part near to a joint direction of the core particle and the shell layer, and calculating an average value of the 10 concentrations. At this time, it is difficult to measure the concentrations of the elements of H, He, Li, and Be by EDX analysis, and thus they are excluded from the target elements. In addition, elements such as C are also excluded, because they may be detected due to attachment of an organic element to the surface layer or contamination.

It is difficult to measure light elements such as Li element by EDX analysis. The concentrations thereof, accordingly, are calculated by ICP analysis and XPS analysis. The amount of Li contained in the active material can be highly quantitatively evaluated by ICP analysis. XPS analysis is an analysis method which is sensitive to a surface, and thus it is possible to examine the presence or absence of Li element in the shell layer from the presence or absence of the peak associated with the Li element.

As the STEM-EDX analysis is a destructive test, it is considered that, for example, when ion milling is performed, an atomic concentration may be shifted from a composition value by the influence of scattering of light elements or diffusion of an atom. It is also likely that an oxygen concentration is shifted from an expected value due to the influence of contamination.

In a case of a material having a low crystallinity, it is likely that the crystal structure is changed to a structure different from an expected one due to heat damage during the ion milling, and thus the result may possibly be different from the crystal structure anticipated by a diffraction pattern obtained, for example, by FFT analysis. In such a case, the crystal structure is specified by a non-destructive test such as XAFS or XRD.

The ICP analysis can be specifically performed as follows: First, the active material, which is an object to be measured, is dissolved by alkaline lysis or acidic cleavage to prepare a sample for measurement. When the active material contained in the battery is analyzed, a phase containing the active material is heated, as above, and the residue is dissolved in an acid to prepare a sample for measurement.

The sample for measurement as prepared above is subjected to ICP emission spectroscopy, whereby a concentration of each metal element per unit weight of the sample for measurement is measured. From the measurement results, a composition ratio of the metal elements contained in the active material can be calculated.

A content of O element contained in the active material can be calculated according to the inert gas fusion-infrared absorbing method as a concentration per unit weight of the active material.

<Measurement Method of Particle Size Distribution of Active Material Particles>

The particle size distribution of the active material particles contained in the active material for a battery can be obtained, for example, by a measurement using a laser diffractometer, or the like, in the case of a powder. For example, a particle size distribution is measured using a laser diffractometer. The range of the particle size to be measured is divided, the ranges of the amount and the size of the particles in each particle size section are divided to obtain the number, and a frequency distribution (%) and a cumulative size distribution (%) are calculated. At this time, aggregation can be prevented by vibration with ultrasonic waves.

From the obtained particle size distribution, an average particle size of the active material particles can be known.

According to the first embodiment, the active material for a battery is provided. The active material for a battery contains active material particles. The active material particles comprise a core particle and a shell layer which covers at least a part of the surface of the core particle. The core particle contains a monoclinic or orthorhombic niobium-titanium composite oxide. The shell layer contains a compound which is at least one compound selected from the group consisting of the lithium-titanium composite oxide, Nb-containing lithium-titanium composite oxide, lithium-niobium composite oxide, lithium phosphate, and Nb-containing lithium phosphate, and which has a composition different from that of the monoclinic or orthorhombic niobium-titanium composite oxide in the core particle. The monoclinic or orthorhombic niobium-titanium composite oxide contained in the core particle has many sites for inserting and extracting lithium per unit volume, and thus a high capacity can be realized. The compound contained in the shell layer can prevent the conduction of a short-circuit current. For that reason, the active material for a battery according to the first embodiment can realize a nonaqueous electrolyte battery capable of showing a high capacity and excellent safety.

Second Embodiment

According to a second embodiment, a nonaqueous electrolyte battery is provided. The nonaqueous electrolyte battery includes a negative electrode, a positive electrode, and nonaqueous electrolyte. The negative electrode includes the active material for a battery according to the first embodiment.

The nonaqueous electrolyte battery according to the second embodiment may further contain a separator disposed between the positive electrode and the negative electrode. The positive electrode, the negative electrode and the separator can be formed into an electrode group. The nonaqueous electrolyte can be held in the electrode group.

The nonaqueous electrolyte battery according to the second embodiment may also contain a container member in which the electrode group and the nonaqueous electrolyte are housed.

Further, the nonaqueous electrolyte battery according to the second embodiment may further contain a positive electrode terminal electrically connected to the positive electrode, and a negative electrode terminal electrically connected to the negative electrode. At least a part of the positive electrode terminal and at least a part of the negative electrode terminal can extend outward from the container member.

The positive electrode, the negative electrode, the non-aqueous electrolyte, the separator, the container member, the positive electrode terminal, and the negative electrode terminal are explained in detail below.

1) Positive Electrode

The positive electrode may contain a current collector and a positive electrode layer (a positive electrode active material-containing layer). The positive electrode layer can be formed on one side or both sides of the current collector. The positive electrode layer may contain a positive electrode active material, and optionally may contain a conductive agent and a binder.

As the positive electrode active material, for example, oxides, sulfites, and polymers may be used.

The oxide and sulfite which can be used may include for example, compounds capable of inserting and extracting lithium such as manganese dioxide ($MnO_2$), iron oxide, copper oxide and nickel oxide, lithium-manganese composite oxide (for example, $Li_xMn_2O_4$ or Li—$MnO_2$), lithium-nickel composite oxide (for example, lithium-cobalt-composite oxide (for $Li_xNiO_2$), example, $Li_xCoO_2$), lithium-nickel-cobalt composite oxide (for example, or $LiNi_{1-y}Co_yO_2$) lithium-manganese-cobalt composite oxide (for example, $Li_xMn_yCo_{1-y}O_2$), lithium-manganese-nickel composite oxide having a spinel structure (for example, $Li_xMn_{2-y}Ni_yO_4$), lithium-phosphorus oxide having an olivine structure (for example, $Li_xFePO_4$, $Li_xFe_{1-y}Mn_yPO_4$, or $Li_xCoPO_4$) iron sulfate ($Fe_2(SO_4)_3$), vanadium oxide (for example, $V_2O_5$), and lithium-nickel-cobalt-manganese composite oxide. In the formulae described above, $0<x\le1$, and $0<y\le1$. These compounds may be used alone or as a combination of multiple compounds thereof as the active material.

As the polymer, for example, electrically conductive polymer materials such as polyaniline and polypyrrole, and disulfide polymer materials may be used. Sulfur (S), fluorocarbon may also be used as the active material.

More preferable examples of the positive electrode active material may include lithium-manganese composite oxide having a high positive electrode voltage (for example, $Li_xMn_2O_4$), lithium-nickel composite oxide (for example, $Li_xNiO_2$), lithium-cobalt composite oxide (for example, $Li_xCoO_2$), lithium-nickel-cobalt composite oxide (for example, $LiNi_{1-y}Co_yO_2$), lithium-manganese-nickel composite oxide having a spinel structure (for example, $Li_xMn_{2-y}Ni_yO_4$), lithium-manganese-cobalt composite oxide (for example, $Li_xMn_yCo_{1-y}O_2$), lithium iron phosphate (for example, $Li_xFePO_4$), and lithium-nickel-cobalt-manganese composite oxide. In the formulae described above, $0<x\le1$ and $0<y\le1$.

Especially, when a nonaqueous electrolyte containing an ordinary temperature molten salt is used, it is preferable to use lithium iron phosphate, $Li_xVPO_4F$, lithium-manganese composite oxide, lithium-nickel-composite oxide, or lithium-nickel-cobalt composite oxide, in terms of the cycle life time. This is because the reactivity between the positive electrode active material and the ordinary temperature molten salt is decreased.

The positive electrode active material has preferably a specific surface area of 0.1 $m^2/g$ to 10 $m^2/g$. The positive electrode active material having a specific surface area of 0.1 $m^2/g$ or more can secure sufficient insertion and extraction sites for lithium ions. The positive electrode active material having a specific surface area of 10 $m^2/g$ or less can be easily handled in industrial production, and can secure a good charge-and-discharge cycle performance.

The binder is added in order to fill the gaps in the dispersed positive electrode active material, and can bind the positive electrode active material to the conductive agent. Examples of the binder may include polytetrafluoroethylene (PTFE), polyvinylidene fluoride (PVdF), and fluororubber.

The conductive agent is added if necessary in order to increase the current collecting performance, and suppress a contact resistance between the positive electrode active material and the current collector. Examples of the conductive agent may include carbonaceous substances such as acetylene black, carbon black, and graphite.

In the positive electrode layer, it is preferable that the positive electrode active material and the binder are contained in contents of 80% by weight to 98% by weight, and 2% by weight to 20% by weight, respectively.

When the binder is contained in a content of 2% by weight or more, sufficient electrode strength can be obtained. When the amount thereof is adjusted to 20% by weight or less, the amount of the insulator added to the electrode is decreased to decrease the internal resistance.

When the conductive agent is added, it is preferable that the positive electrode active material, the binder, and the conductive agent are contained in contents of 77% by weight to 95% by weight, 2% by weight to 20% by weight, and 3% by weight to 15% by weight, respectively. When the conductive agent is contained in a content of 3% by weight or more, the effects described above can be exhibited. When the amount thereof is adjusted to 15% by weight or less, decomposition of the nonaqueous electrolyte on the surface of the positive electrode conductive agent can be decreased during storage at a high temperature.

The positive electrode current collector is preferably an aluminum foil and aluminum alloy foil containing at least one element selected from the group consisting of Mg, Ti, Zn, Ni, Cr, Mn, Fe, Cu, and Si.

Each of the aluminum foil and the aluminum alloy foilmentioned above desirably has a thickness of 5 μm to 20 μm, and more preferably 15 μm or less. The aluminum foil preferably has a purity of 99% by weight or higher. It is preferable to decrease a content of a transition metal such as iron, copper, nickel or chromium contained in each type of the aluminum foil and the aluminum alloy foil to 1% by weight or lower.

The positive electrode is produced, for example, by dispersing the positive electrode active material and the binder, and the conductive agent added if necessary in an appropriate solvent to prepare a slurry, coating the obtained slurry on the positive electrode current collector, drying it to form a positive electrode layer, and pressing it. The positive electrode may also be produced by forming the positive electrode active material and the binder, and the conductive agent added if necessary into pellets to form a positive electrode layer, and forming it on the current collector.

2) Negative Electrode

The negative electrode may include a current collector and a negative electrode layer (a negative electrode active material-containing layer). The negative electrode layer may be formed on one side or both sides of the current collector. The negative electrode layer may include a negative electrode active material, and may optionally contain a conductive agent and a binder.

The active material for a battery according to the first embodiment may be contained in the negative electrode layer as the negative electrode active material.

The active material for a battery according to the first embodiment can realize a nonaqueous electrolyte battery capable of showing a high capacity, excellent safety and life time characteristic as described above. For that reason, the nonaqueous electrolyte battery having a negative electrode containing an active material for a battery according to the first embodiment can show a high capacity and excellent safety and life time characteristic.

The negative electrode layer may include only the active material according to the first embodiment as the negative electrode active material, but may further contain another negative electrode active material. As the other negative electrode active material, it is possible to use anatase-type titanium dioxide $TiO_2$, monocline type β-type titanium dioxide $TiO_2$ (B), ramsdellite-type lithium titanate $Li_2Ti_3O_7$, spinel type lithium titanate $Li_4Ti_5O_{12}$, niobium oxide, or the like. These oxide compounds have a specific gravity close to that of a compound contained in the active material for a battery according to the first embodiment and are easily mixed and dispersed, and thus they can be preferably used.

The conductive agent is added if necessary, in order to increase the current collecting performance of the negative electrode active material and suppress the contact resistance between the negative electrode active material and the current collector. Examples of the conductive agent may include carbonaceous substances such as acetylene black, carbon black, and graphite.

The binder is added in order to fill the gaps in the negative electrode active material dispersed, and can bind the negative electrode active material to the conductive agent. Examples of the binder may include polytetrafluoroethylene (PTFE), polyvinylidene fluoride (PVdF), fluororubber, and styrene-butadiene rubber.

The negative electrode layer contains preferably the negative electrode active material, the conductive agent, and the binder in contents of 68% by weight to 96% by weight, 2% by weight to 30% by weight, and 2% by weight to 30% by weight, respectively. When the content of the conductive agent is 2% by weight or more, the current collecting performance of the negative electrode layer is good. When the content of the binder is 2% by weight or more, the negative electrode layer is sufficiently bound to the current collector, and excellent cycle characteristic can be expected. On the other hand, in order to increase the capacity of the nonaqueous electrolyte battery, it is preferable to adjust the binder content to 30% by weight or more.

For the negative electrode current collector, a material which is electrochemically stable at an insertion and extraction voltage of lithium of the negative electrode active material is used. It is preferable to produce the negative electrode current collector from copper, nickel, stainless steel, aluminum, or aluminum alloy containing at least one element selected from the group consisting of Mg, Ti, Zn, Mn, Fe, Cu and Si. The current collector has preferably a thickness of 5 to 20 μm. A current collector having such a thickness can be well-balanced in the strength of the negative electrode and reduced weight.

The negative electrode is produced, for example, by dispersing the negative electrode active material, the conductive agent, and the binder in a solvent generally used to prepare a slurry, coating the slurry on the current collector, drying it to form the negative electrode layer, and pressing it. The negative electrode may also be produced by forming the negative electrode active material, the conductive agent, and the binder into pellets to form a negative electrode layer, and forming it on the current collector.

3) Nonaqueous Electrolyte

The nonaqueous electrolyte may be, for example, a liquid nonaqueous electrolyte prepared by dissolving an electrolyte in an organic solvent, or a gelatinous nonaqueous electrolyte in which the liquid electrolyte is conjugated with a polymer material.

A liquid nonaqueous electrolyte in which the electrode is dissolved in the organic solvent in a concentration of 0.5 mole/L to 2.5 mole/L is preferable.

Examples of the electrode may include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bis-trifluoromethylsulfonylimide [$LiN(CF_3SO_2)_2$], and mixtures thereof. An electrolyte which is not easily oxidized even at a high potential is preferable, and $LiPF_6$ is most preferable.

Examples of the organic solvent may include cyclic carbonates such as propylene carbonate (PC), ethylene carbonate (EC) and vinylene carbonate; linear carbonates such as diethyl carbonate (DEC), dimethyl carbonate (DMC), and methylethyl carbonate (MEC); cyclic ethers such as tetrahydrofuran (THF), 2-methyl tetrahydrofuran (2Me THF), and dioxolane (DOX); linear ethers such as dimethoxyethane (DME) and diethoxyethane (DEE); γ-butyrolactone (GBL), acetonitrile (AN), and sulpholane (SL). The organic solvents may be used alone or in the state of a mixed solvent.

Examples of the polymer material may include polyvinylidene fluoride (PVdF), polyacrylonitrile (PAN), and polyethylene oxide (PEO).

Alternatively, as the nonaqueous electrolyte, a normal temperature molten salt (ionic melt) containing lithium ions, a polymer solid electrolyte, or an inorganic solid electrolyte may be used.

The normal temperature molten salt (an ionic melt) refers to a compound which can exist in a liquid state at normal temperature (from 15 to 25° C.) among organic salts consists of a combination of an organic cation and an anion. Such normal temperature molten salt may include normal temperature molten salts which exist in a liquid state as they are, normal temperature molten salts which are in a liquid state by mixing with electrolyte, and normal temperature molten salts which are in a liquid state by being dissolved in an organic solvent. The normal temperature molten salt generally used in a nonaqueous electrolyte battery has a melting point of 25° C. or lower. The organic cation generally has a quaternary ammonium skeleton.

The polymer solid electrolyte is prepared by dissolving the electrolyte in the polymer material, and solidifying it.

The inorganic solid electrolyte is a solid substance having lithium ion conductivity.

4) Separator

The separator may be formed, for example, of a porous film containing polyethylene, polypropylene, cellulose or polyvinylidene fluoride (PVdF) or synthetic resin non-woven fabric. Of these, a porous films containing polyethylene or polypropylene is preferable and can improve safety, because they can melt at a given temperature and can cut off the current.

5) Container Member

For a container member, a laminate film having a thickness of 0.5 mm or less, or a metal container having a thickness of 1 mm or less may be used. The laminate film has more preferably a thickness of 0.2 mm or less. The metal container has more preferably a thickness of 0.5 mm or less, even more preferably 0.2 mm or less.

The shape of the container member may include a flat-type (thin-type), a square-type, a cylindrical type, a coin-type, a button-type, and the like. The container member may include, for example, depending on the battery size, a container member for a compact battery mounted on a portable electronic device, or a container member for a large scale battery mounted on a two-wheel to four-wheel automobile may be used.

As the laminate film, a multi-layer film in which a metal layer is inserted between resin films may be used. As the metal layer an aluminum foil or an aluminum alloy foil is preferable in order to reduce the weight. As the resin film, for example, polymer materials such as polypropylene (PP), polyethylene (PE), nylon, and polyethylene terephthalate (PET) may be used. The laminate film may be sealed by heat-sealing and forming into the shape of the container member.

The metal container may be produced from aluminum or aluminum alloy. An alloy containing an element of magnesium, zinc, or silicon is preferable as the aluminum alloy. When the alloy contains a transition metal such as iron, copper, nickel, or chromium, it is preferable to adjust the content thereof to 1% or less, whereby long-term reliability and heat dissipation can be remarkably improved under a high temperature environment.

Next, the nonaqueous electrolyte battery according to the second embodiment is specifically explained referring to the drawings.

Figure 7:
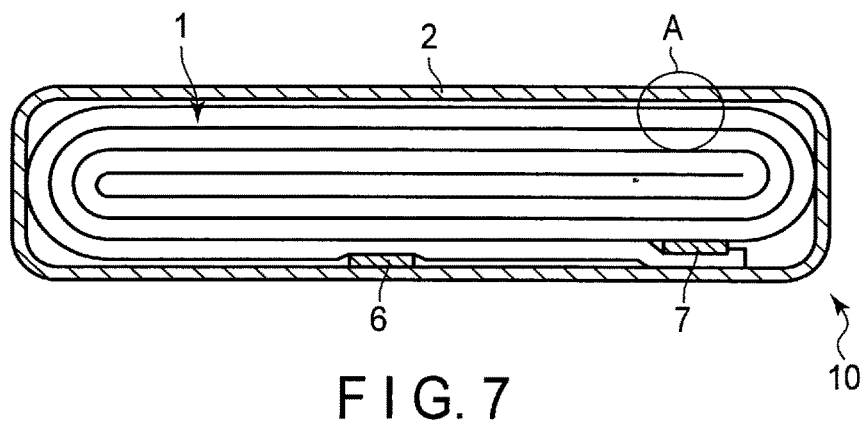
FIG. 7 is a cross-sectional view showing one example of flat nonaqueous electrolyte batteries according to a second embodiment.
Figure 8:
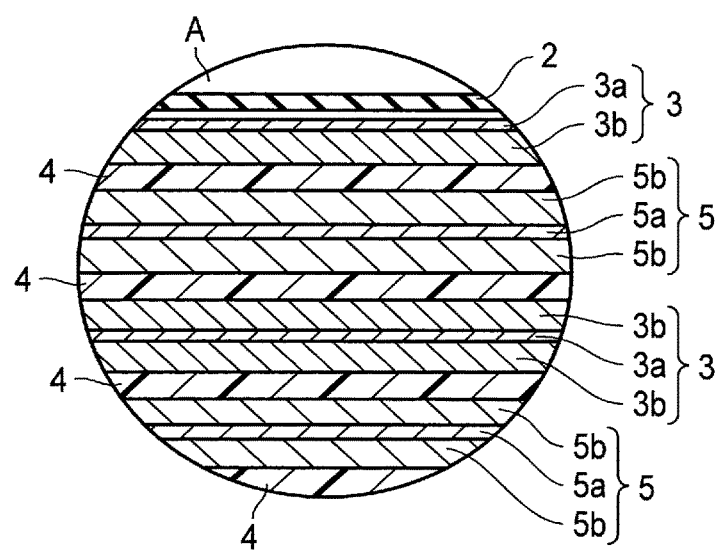
FIG. 8 is an enlarged cross-sectional view showing a part A in FIG. 7.

FIG. 7 is a cross-sectional view showing one example of flat nonaqueous electrolyte batteries according to a second embodiment. FIG. 8 is an enlarged cross-sectional view showing a part A in FIG. 7.

A nonaqueous electrolyte battery 10, shown in FIG. 7 and FIG. 8, contains a bag-shaped container member 2 shown in FIG. 7, an electrode group 1 shown in FIG. 7 and FIG. 8, and nonaqueous electrolyte, not shown. An electrode group 1 and a nonaqueous electrolyte are housed in a container member 2. The nonaqueous electrolyte is held in the electrode group 1.

The bag-shaped container member 2 is formed of a laminate film containing two resin layers and a metal layer inserted between them.

As shown in FIG. 7, the electrode group 1 is a flat wound electrode group. The flat wound electrode group 1 is formed by spirally winding a laminate in which a negative electrode 3, a separator 4, a positive electrode 5, and a separator 4 are laminated in this order from the outside as shown in FIG. 8, and subjecting the laminate to press molding.

The negative electrode 3 contains a negative electrode current collector 3a, and a negative electrode layer 3b. The negative electrode layer 3b contains an active material for a battery according to the first embodiment. The negative electrode 3 of the outermost shell has, as shown in FIG. 8, a structure in which the negative electrode layer 3b is formed only on one side of the inner surface side of the negative electrode current collector 3a. In the other negative electrode 3, the negative electrode layers 3b are formed on both sides of the negative electrode current collector 3a.

The positive electrode 5 contains a positive electrode current collector 5a and positive electrode layers 5b formed on both sides thereof.

As shown in FIG. 7, in the vicinity of an outer circumferential end of the wound electrode group 1, a negative electrode terminal 6 is connected to the negative electrode current collector 3a of the negative electrode 3 in the outermost shell, and a positive electrode terminal 7 is connected to the positive electrode current collector 5a of the positive electrode 5 in the inside. The negative electrode terminal 6 and the positive electrode terminal 7 extend from an opening of the bag-shaped container member 2 to the outside.

The nonaqueous electrolyte battery 10 shown in FIG. 7 and FIG. 8 can be produced, for example, by the following procedures. First, an electrode group 1 is produced. Then, the electrode group 1 is enclosed in a bag-shaped container member 2. At that time, one end of the negative electrode terminal 6 and one end of the positive electrode terminal 7 is protruded outward the container member 2. Next, the circumference of the container member 2 is heat-sealed, provided that a part thereof is left unsealed. Next, at the part which is not heat-sealed, for example, liquid nonaqueous electrolyte is poured into the bag-shaped container member 2 through the opening. Finally, the opening is heat-sealed to seal up the wound electrode group 1 and the liquid nonaqueous electrolyte.

Figure 9:
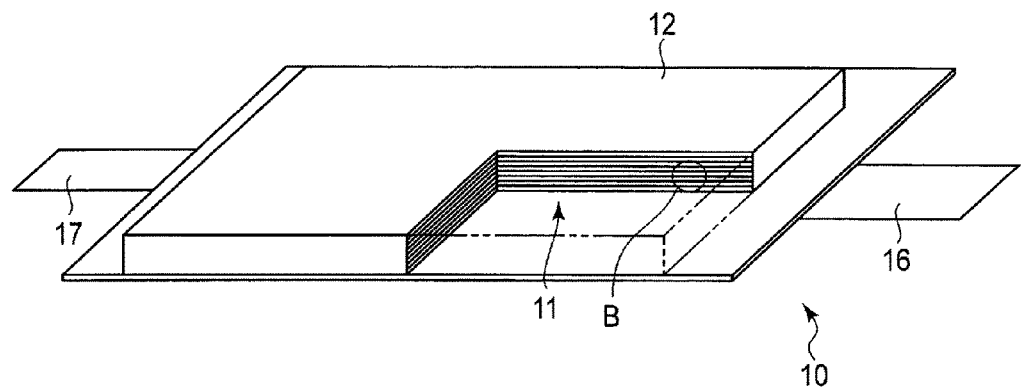
FIG. 9 is a partially cutaway perspective view schematically showing another flat nonaqueous electrolyte battery according to the second embodiment.
Figure 10:
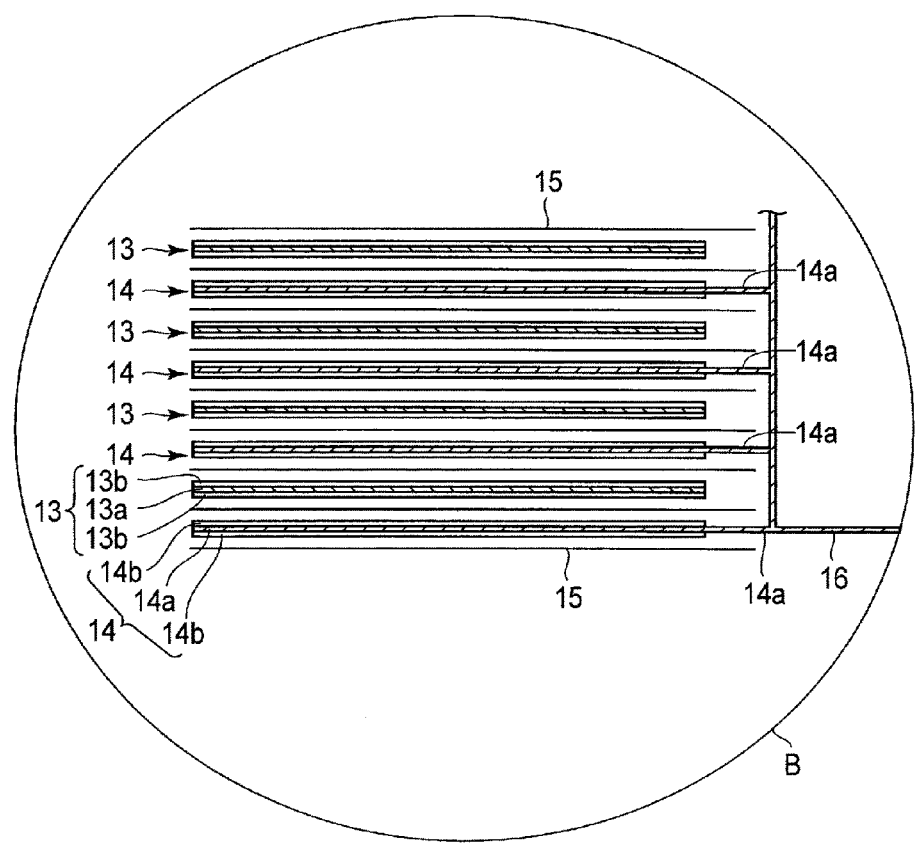
FIG. 10 is an enlarged cross-sectional view showing a part B in FIG. 9.

The nonaqueous electrolyte battery according to the second embodiment is not limited to the nonaqueous electrolyte battery shown in FIG. 7 and FIG. 8, but may be a battery having, for example, a structure shown in FIG. 9 and FIG. 10.

FIG. 9 is a partially cutaway perspective view schematically showing another flat nonaqueous electrolyte battery according to the second embodiment. FIG. 10 is an enlarged cross-sectional view showing a part B in FIG. 9.

A nonaqueous electrolyte battery 10 shown in FIG. 9 and FIG. 10 contains an electrode group 11 shown in FIG. 9 and FIG. 10, a container member 12 shown in FIG. 9, and nonaqueous electrolyte, not shown. The electrode group 11 and the nonaqueous electrolyte are housed in a container member 12. The nonaqueous electrolyte is held in the electrode group 11.

The container member 12 is formed of a laminate film containing two resin layers and a metal layer inserted between them.

The electrode group 11 is, as shown in FIG. 10, a laminated electrode group. The laminated electrode group 11 has, as shown in FIG. 10, a structure in which the positive electrode 13 and the negative electrode 14 are alternatively laminated, with a separator 15 being inserted between them.

The electrode group 11 contains multiple positive electrodes 13. The multiple positive electrodes 13 each contain a positive electrode current collector 13a, and positive electrode layers 13b carried on both sides of the positive electrode current collector 13a. The electrode group 11 also contains multiple negative electrodes 14. The multiple negative electrodes 14 each contain a negative electrode current collector 14a, and negative electrode layers 14b carried on both sides of the negative electrode current collector 14a. One side of the negative electrode current collector 14a of each negative electrode 14 protrudes from the negative electrode 14. The protruding negative electrode current collector 14a is electrically connected to a belt-shaped negative electrode terminal 16. The tip of the belt-shaped negative electrode terminal 16 is drawn outward from the container member 12. In the positive electrode current collector 13a of the positive electrode 13, a side located on the opposite side of the protruding side of the negative electrode current collector 14a protrudes from the positive electrode 13, although this is not shown. The positive electrode current collector 13a protruding from the positive electrode 13 is electrically connected to the belt-shaped positive electrode terminal 17. The tip of the belt-shaped positive electrode terminal 17 is located on the opposite side of the negative electrode terminal 16, and drawn out from the side of the container member 12.

The nonaqueous electrolyte battery according to the second embodiment contains the negative electrode containing the active material for a battery according to the first embodiment. As a result, the nonaqueous electrolyte battery according to the second embodiment can show a high capacity and excellent safety.

Third Embodiment

According to a third embodiment, a battery pack is provided. The battery pack includes a nonaqueous electrolyte battery according to the second embodiment.

The battery pack according to the third embodiment can contain one or multiple nonaqueous electrolyte batteries (unit cells) according to the second embodiment, as described above. The multiple nonaqueous electrolyte batteries contained in the battery pack according to the third embodiment may also be electrically connected to in series, in parallel, or with a combination of series connection and parallel connection to form a battery module. The battery pack according to the third embodiment may include multiple battery modules.

The battery pack according to the third embodiment may further comprise a protective circuit. The protective circuit has a function to control charging and discharging of the nonaqueous electrolyte battery. Alternatively, a circuit included in an equipment where the battery pack serves as a power source (for example, electronic devices, vehicles, and the like) may be used as the protective circuit for the battery pack.

Moreover, the battery pack according to the third embodiment may further comprise a power distribution external terminal. The power distribution external terminal is configured to externally output the current from the nonaqueous electrolyte battery, and to input the current to the nonaqueous electrolyte battery. In other words, when the battery pack is used as a power source, the current is externally provided via the power distribution external terminal. Also, when the battery pack is charged, the charging current (including regenerative energy caused by power of vehicles such as automobiles) is provided to the battery pack via the power distribution external terminal.

Next, one example of the battery packs according to the third embodiment is explained referring to the drawings.

Figure 11:
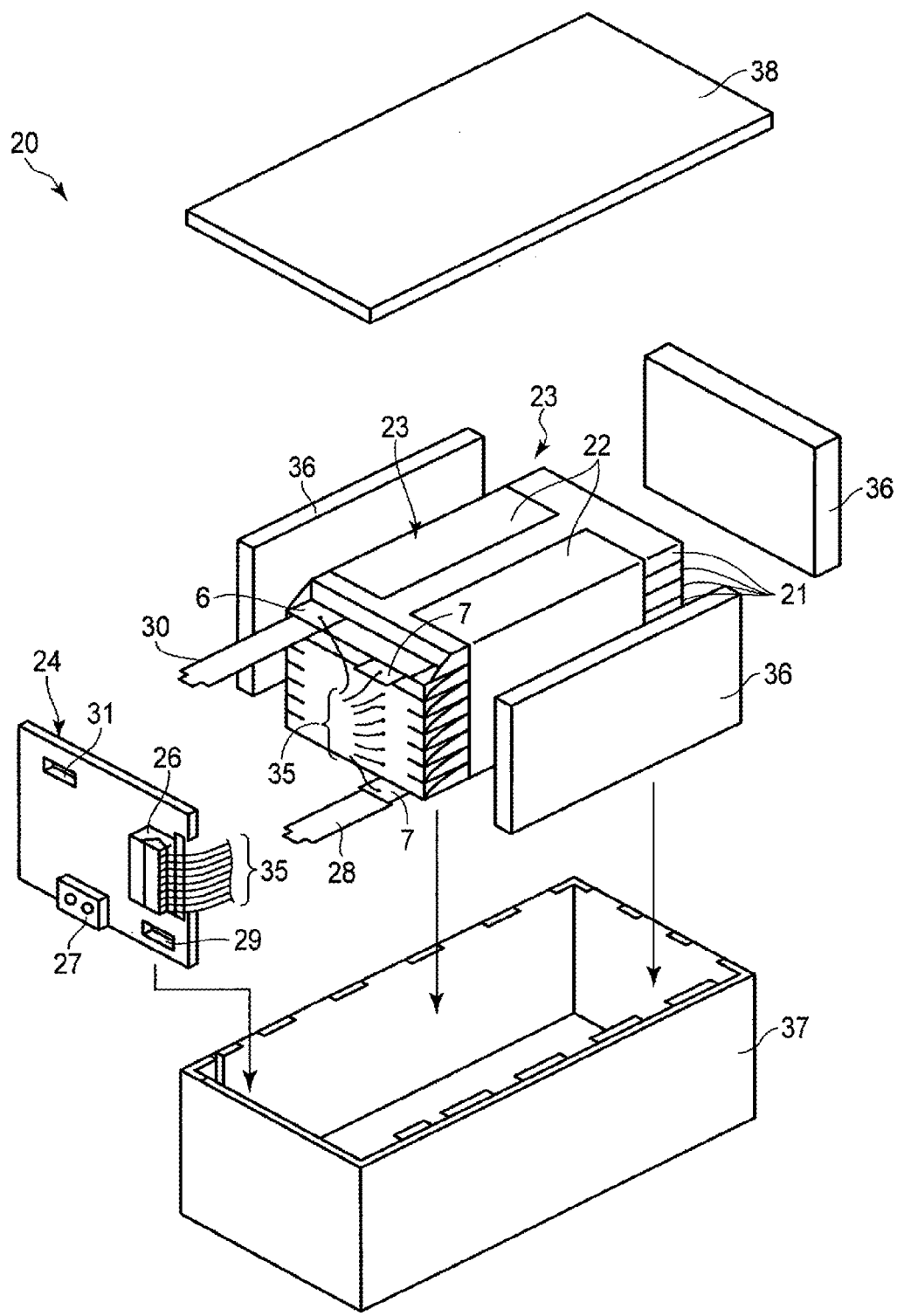
FIG. 11 is an exploded perspective view showing one example of battery packs according to a third embodiment.

FIG. 11 is an exploded perspective view showing one example of battery packs according to the third embodiment. FIG. 12 is a block diagram showing an electric circuit of the battery pack in FIG. 11.

A battery pack 20 shown in FIG. 11 and FIG. 12 contains multiple unit cells 21. The multiple unit cells 21 are flat nonaqueous electrolyte batteries 10, and are explained referring to FIG. 7 and FIG. 8.

In the multiple unit cells 21, a negative electrode terminal 6 and a positive electrode terminal 7, which extend outward, are arranged in the same direction and laminated, and are fastened with a pressure-sensitive adhesive tape 22 to form a battery module 23. The unit cells 21 are electrically connected to each other in series, as shown in FIG. 12.

A printed wiring board 24 is arranged facing the side surface of the battery module 23 from which the negative electrode terminal 6 and the positive electrode terminal 7 extend. On the printed wiring board 24, as shown in FIG. 12, a thermistor 25, a protective circuit 26, and an energizing terminal 27 to external devices are mounted. Wiring of the battery module 23 and an insulating plate (not shown) to avoid unnecessary contact are attached to the surface of the printed wiring board 24 facing the battery module 23.

A lead 28 on the positive electrode side is connected to the positive electrode terminal 7 located on the undermost layer of the battery module 23, and the tip thereof is inserted into and electrically connected to a connecter 29 on the positive electrode side of the printed wiring board 24. A lead 30 on the negative electrode side is connected to the negative electrode terminal 6 located on the uppermost layer of the battery module 23, and the tip thereof is inserted into and electrically connected to the connector 31 on the negative electrode side of the printed wiring board 24. The connectors 29 and 31 are connected to the protective circuit 26 through wirings 32 and 33 formed on the printed wiring board 24.

The thermistor 25 detects a temperature of the unit cells 21, and the detected signals are transmitted to the protective circuit 26. The protective circuit 26 can cut off wiring 34a on a plus side and wiring 34b on a minus side between the protective circuit 26 and the energizing terminal 27 to the external devices under a pre-determined condition. The pre-determined condition is, for example, a case in which a temperature detected by the thermistor 25 reaches a temperature higher than a pre-determined temperature. Another pre-determined condition is a case in which over-charge, over-discharge, over-current, and the like of the unit cells 21 are detected. The detection of over-charge is performed for individual unit cells 21 or for the whole battery module 23. When individual unit cell 21 detection is performed, a battery voltage may be detected, or a positive electrode potential or a negative electrode potential may be detected. In the latter case, a lithium electrode, which is used as a reference electrode, is inserted into each unit cell 21. In a case of the battery pack 20 shown in FIG. 11 and FIG. 12, wiring 35, which is used for detecting a voltage, is connected to each unit cell 21, and detection signals are sent to the protective circuit 26 through the wiring 35.

On three side surfaces of the battery module 23 excluding the side surface from which the positive electrode terminal 7 and the negative electrode terminal 6 extend, rubber or resin protective sheets 36 are arranged.

The battery module 23 is housed in a storage container 37 together with various protective sheets 36 and the printed wiring board 24. The protective sheets 36 are arranged on both inside surfaces in a long side direction of the storage container 37 and on one inside surface in a short side direction, and the printed wiring board 24 is arranged on the other inside surface on the opposite side in the short side direction. The battery module 23 is located in a space surrounded by the protective sheets 36 and the printed wiring board 24. A lid 38 is attached to an upper surface of the storage container 37.

For fixing the battery module 23, a heat-shrinkable tape may be used instead of the pressure-sensitive adhesive tape 22. In this case, the protective sheets are arranged on both sides of the battery module, which is enclosed by a heat-shrinkable tape, and then the heat-shrinkable tape is heat-shrunk to fasten the battery module.

In FIG. 11 and FIG. 12, the aspect in which the multiple unit cells 21 are connected in series is shown, but the cells may be connected in parallel in order to increase the battery capacity. Alternatively, a connection in series and in parallel may be combined. The assembled battery packs may be connected in series or in parallel.

An aspect of the battery pack according to the third embodiment is varied depending on the use. The battery pack according to the third embodiment is preferably used when an excellent cycle characteristic is required when a large current is taken out. Specifically, it is used as a power source for a digital camera, or a battery for installation on a vehicle such as a two-wheeled to four-wheeled hybrid electric automobile, a two-wheeled to four-wheeled electric automobile, or an assist bicycle. In particular, it is preferably used for a battery for installation on an automobile.

In a vehicle having the battery pack according to the third embodiment mounted, the battery pack is configured to, for example, recover regenerative energy caused by power of the vehicle. Examples of the vehicle include two to four-wheeled hybrid electric automobiles, two to four-wheeled electric automobiles, electric assist bicycles, and electric trains.

The battery pack according to the third embodiment contains the nonaqueous electrolyte battery according to the second embodiment. As a result, the battery pack according to the third embodiment can show a high capacity and excellent safety.

Fourth Embodiment

According to a fourth embodiment, a vehicle is provided. The vehicle includes a battery pack according to the third embodiment.

Figure 20:
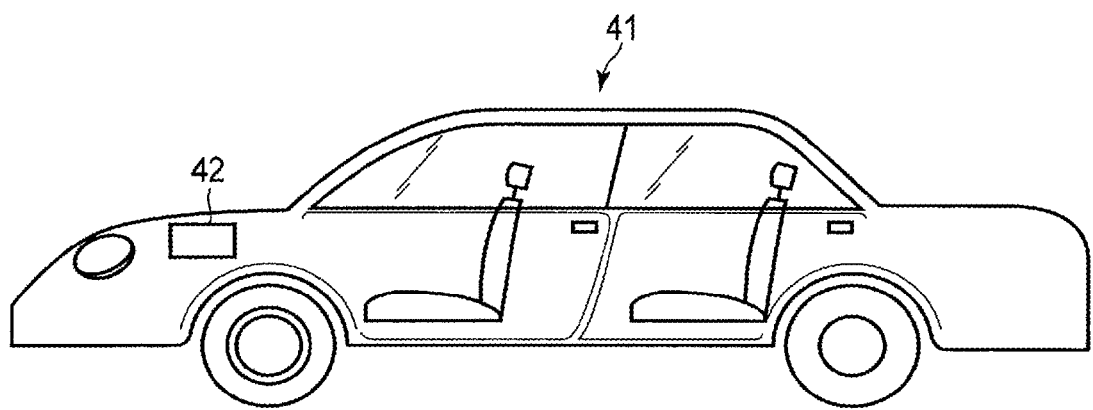
FIG. 20 shows an example of a vehicle according to a fourth embodiment.

FIG. 20 shows an example of an automobile which includes a battery pack according to a third embodiment.

The automobile 41 shown in FIG. 20 includes a battery pack 42 which is an example of the battery pack according to the third embodiment mounted in its engine room. The mounting position is not limited to engine rooms. For example, the battery pack may also be mounted in rear parts of automobiles or under seats.

EXAMPLE

Examples are explained below, but the present invention is not limited to the Examples described below without departing from the scope of the present invention.

Example 1

In Example 1, an active material for a battery was produced in the following procedures.

<Production of Core Particle>

As starting materials, a powder of titanium dioxide $TiO_2$ and a powder of niobium pentaoxide $Nb_2O_5$ were prepared. Then, they were weighed in a molar ratio of 1:1. They were placed into a wet ball mill together with ethanol, which is a solvent, and were mixed and pulverized. After the pulverization, solid matter was separated from the solvent by filtration and drying. Thus, a precursor powder containing titanium dioxide and niobium pentaoxide was obtained.

Next, the precursor powder was put in an alumina crucible furnace, which was fired at 1000° C. over 12 hours. After the firing, the fired product was pulverized into a powder. The powder was then again subjected to mixing and pulverization in the wet ball mill. Then, the mixture was filtered and dried to obtain a fired powder. The resulting powder was placed in an alumina crucible furnace again, and the firing was performed at 1100° C. over 12 hours. After that, the resulting powder was pulverized to obtain a desired product.

The product obtained by this firing was subjected to an XRD measurement. It was observed that all peaks in the obtained XRD pattern coincided well with peaks described in PDF Number: 01-077-1374 in terms of strength and 2θ values. From the results, it was confirmed that the product has a single phase structure belonging to an $Nb_2TiO_7$ phase.

The particle size was measured using a laser diffraction particle size distribution measuring apparatus. It was confirmed that an average particle size (d50) calculated at a cumulative frequency of 50% was 0.9 μm.

The thus obtained product was used as a core particle of Example 1.

<Formulation of Shell Layer>

Next, a shell layer was covered on a surface of a core particle by rolling fluidized bed granulation according to the following procedures. Rolling fluidized bed granulation is a method in which a sol-gel solution is sprayed on a fluidized bed.

First, a sol-gel solution was prepared. Titanium tetraisopropoxide and absolute ethanol were mixed in an inert atmosphere having a dew-point temperature of −40° C. (dp). Metal Li was dissolved in the mixed solution while being stirred to obtain a sal-gel solution containing Ti and Li. The solution had a molar ratio of Ti:Li=4:5, and a solid content of 30% by weight, calculated based on the Li metal and tetraisopropoxide as the solid matter.

On the other hand, in a rolling fluidized bed apparatus, the powder of the core particles of Example 1 was fluidized at a rotor rotation of 400 rpm and an air inflow rate of 20 m³/hour to produce a fluidized bed.

The sol-gel solution, prepared above, was sprayed to the fluidized bed at a spray speed of 4 g/minute, during which the stream temperature was adjusted to 80° C. A total spray amount of the solution to the weight of the active material was adjusted to 35% by weight. Thus, a composite product containing the core particle of Example 1 and the shell layer covered on the surface thereof was produced.

<Production of Active Material for Battery>

The composite products obtained by using the rolling fluidized bed apparatus as described above were put in an alumina crucible furnace. Here, the composite products were fired at a firing temperature of 400° C. over one hour in air. Thus, an active material for a battery of Example 1 was obtained.

[Analysis]

Figure 13:
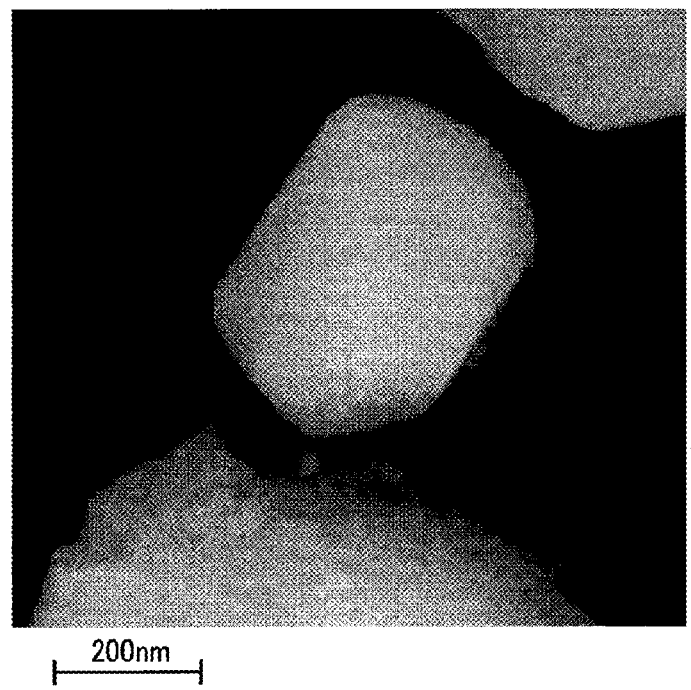
FIG. 13 is a high-angle annular dark field scanning transmission electron microphotograph showing a part of an active material for a battery from Example 1.
Figure 14:
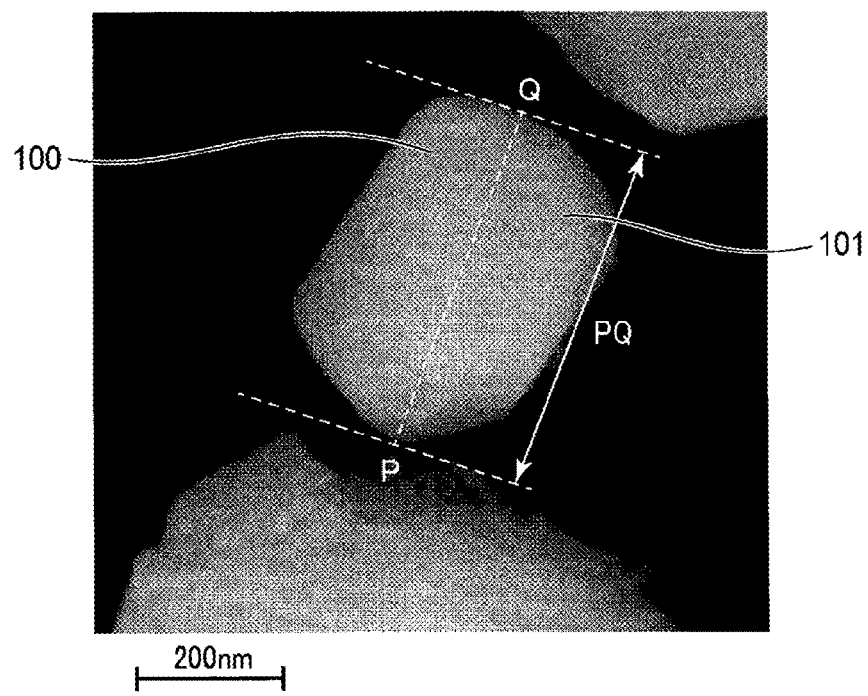
FIG. 14 is a view in which a line segment PQ is drawn on the photograph shown in FIG. 13.

A part of the active material for a battery of Example 1 was fixed on an epoxy embedding resin. Then, the fixed active material was subjected to mechanical polishing and ion milling to produce a thin film sample. The thin film sample was subjected to TEM (HAADF-STEM) observation at an acceleration voltage 300 kV. One example of the HAADF-STEM image observed is shown in FIG. 13. A view in which a line segment PQ is drawn on the photograph shown in FIG. 13 is shown in FIG. 14. A partially enlarged image of FIG. 13 is shown in FIG. 15. In addition, a view in which a line segment RS is drawn on the photograph of FIG. 15 is shown in FIG. 16.

In the active material particles shown in FIG. 13 to FIG. 16, areas 101 having a high lightness are core particles (primary particles) belonging to the $Nb_2TiO_7$ phase. On the other hand, in FIG. 15 and FIG. 16, areas having a lightness lower than that of the core particle, which are intended to cover the outer surface of the core primary particle 101 and surround the core primary particle 101, correspond to the shell layer 102. The reason why a difference in lightness appears as above results from the fact that a larger amount of the niobium element having a high atomic weight is contained in the core particle 101 compared to the shell layer 102.

From the HAADF-STEM images of the active material for a battery of Example 1, an average particle size of the core particle and a thickness of the shell layer were measured according to the method described above. For example, the particle size of the core particle 101, which is the primary particle, shown in FIG. 14 was PQ=0.52 μm. The thickness of the shell layer 102 shown in FIG. 16 was RS=0.03 μm. From these results, in the active material particle 100 shown in FIG. 13 and FIG. 14, a ratio of the thickness of the shell layer 102 to the particle size of the core particle 101 was 5.8%.

The methods described above were applied to 10 particles, and the thickness of the shell layer was calculated from the average value thereof. It was 7.2%.

Next, from the STEM-EDX analysis, an atomic concentration in the active material for a battery of Example 1 was calculated.

The measurement conditions are: acceleration voltage of 200 kV, beam diameter of 0.2 nm, and measurement time of 15 seconds or more. Analysis Station was used as the analysis software. EDX spectra were obtained in a one dimensional direction toward the shell layer from the core particle. From the obtained EDX spectra, calculation was performed at each measurement point of the concentration based on spectra belonging to Ti and Nb elements as atoms.

Figure 17:
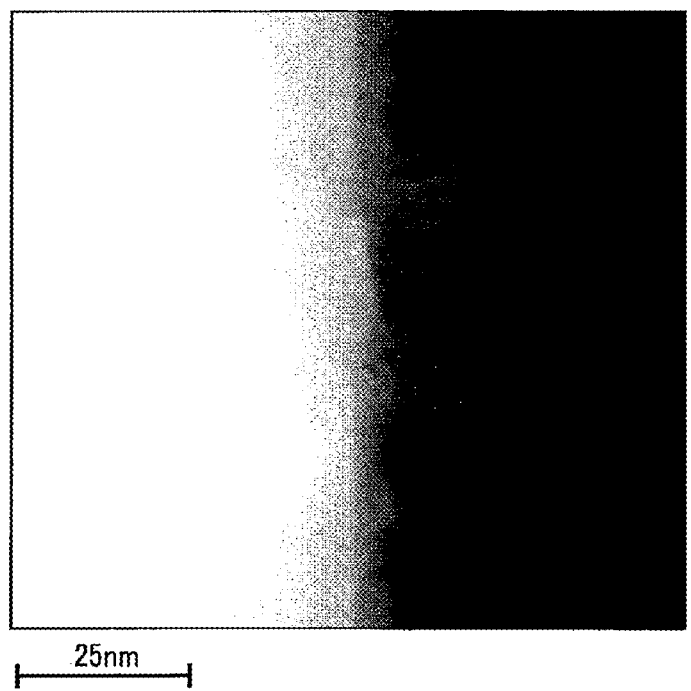
FIG. 17 is a high-angle annular dark field scanning transmission electron microphotograph showing another part of the active material for the battery from Example 1.
Figure 18:
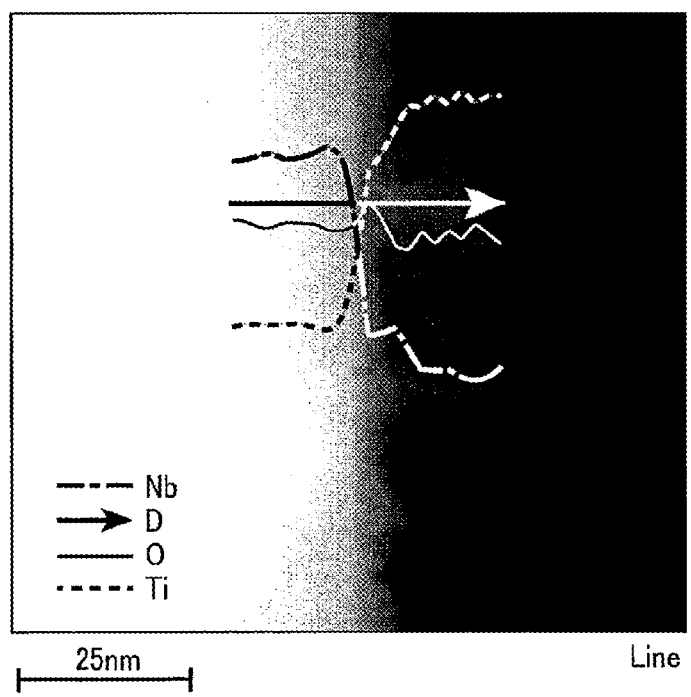
FIG. 18 is a view in which an element concentration mapping is described in the photograph of FIG. 17.

Apart of the HAADF-STEM image of another part of the active material for the battery from Example 1 is shown in FIG. 17. A view in which an element concentration mapping is described in a one dimensional direction of the active material for a battery of Example 1 in the photograph of FIG. 17 is shown in FIG. 18. In addition, an element concentration mapping of the active material for a battery from Example 1 in a one-dimensional direction is shown in FIG. 19. The mappings in FIG. 18 and FIG. 19 correspond to the photograph shown in FIG. 17. A distance [nm] on the horizontal axis in FIG. 19 is a distance in a direction D shown in FIG. 18, i.e., in a direction from the core particle to the shell layer.

From the mapping shown in FIG. 19, a tendency was found in which the atomic concentration of the Nb element in the shell layer of the active material for a battery of Example 1 was gradually decreased in a direction D from the point of contact with the core particle toward the particle surface. This is considered to be caused by the occurrence of diffusion of the Nb element of the mother material of the core particle in the shell layer. For that reason, it is considered that in the active material for a battery of Example 1, the core particles are joined to the shell layer through a diffusion bond of Nb in the active material particles.

As the STEM-EDX analysis is a destructive test, it is considered that, for example, when the ion milling is performed, an atomic concentration may be shifted from a composition value due to the influence of scattering of the light element or diffusion of an atom. It is also likely that an oxygen concentration is shifted from an expected value due to the influence of contamination.

For those reasons, it is considered that the actually measured atomic concentration contains an error of about ±5 to 10 atm % from the true value actually considered. The shift of the composition values of the core particle of the active material for a battery of Example 1 obtained from the measured values from expected values, i.e., Nb=20 atm %, Ti=10 atm %, and 0=70 atm %, which are calculated from the $Nb_2TiO_7$ phase, is caused due to the reasons described above.

Atomic concentrations were calculated at 10 points at 2 nm intervals from a part near to a joint direction of the core particle and the shell layer, and from the average value thereof, a Ti atomic concentration and an Nb atomic concentration were calculated as an average value. As a result, the Ti atomic concentration was 58.6 atm %, and the Nb atomic concentration was 7.2 atm %.

A concentration of the Li element in the active material for a battery of Example 1 was checked based on ICP analysis (SPS-3520UV manufactured by SII Nanotechnologies Inc.). As a result, it was found that the active material for a battery of Example 1 contained Li in a content of 0.24% by weight relative to the total weight of the active material. From this result, it was found that the active material for a battery of Example 1 contained Li.

Further, the active material for a battery of Example 1 was analyzed according to XPS analysis (Quanta SXM manufactured by PHI, Inc.). The analysis conditions are: excited X-rays: monochromatic Al $K\alpha_{1,2}$ rays (1486.6 eV); X-ray diameter: 200 μm, and photoelectron detection angle: 45°. XPS analysis of the surface of the active material detected a peak belonging to Li1s. From this result, it was judged that at least the shell layer of the active material for a battery of Example 1 contained the Li element.

From the results described above, the shell layer of the active material for a battery of Example 1 was a Nb-containing lithium-titanium composite oxide having an Nb content of 7.2 atm %.

[Evaluation]

<Production of Test Cell>

Using the active material for a battery of Example 1, a test cell was produced in the following procedures.

First, acetylene black and carbon nanofiber, which were conductive aids, and polyvinylidene fluoride (PVdF), which was a binder, were prepared.

Next, the active material for a battery of Example 1, acetylene black, carbon nanofibers, and PVdF were placed into N-methylpyrrolidone (NMP), which was a dispersion solvent, in a mixing ratio of 100 parts by mass:10 parts by mass:10 parts by mass:10 parts by mass, and were mixed to prepare a slurry. The obtained slurry was coated on one side of a current collector formed of an aluminum foil having a thickness of 12 μm to obtain a coating film. The obtained coating film was dried and pressed to produce an electrode of Example 1. The coating weight of the electrode was adjusted to 60±2 g/m².

A three electrode glass cell for test of Example 1 in which the thus produced electrode of Example 1 was used as an action electrode, and Li metal was used as a counter electrode and a reference electrode was produced. A solution in which 1 M of $LiPF_6$ was dissolved in a mixed solvent containing ethylene carbonate and diethyl carbonate at a volume ratio of 1:2 was used as a nonaqueous electrolyte.

<Test>

The glass cell for test of Example 1, produced as above, was subjected to a single pole test in the following procedures.

First, the test cell of Example 1 was put in an atmosphere having a temperature of 25° C. Next, the test cell of Example 1 was charged at a constant current of 1 C until the potential of the action electrode reached 1.2 V (vs. $Li^+/Li$), and was kept at a constant voltage of 1.2 V (vs. $Li^+/Li$). The keeping time was set at 3 hours. A charge capacity [mAh/g] per weight of the active material at a 1 C constant current-constant voltage charge was measured. Next, the test cell of Example 1 in this state was discharged at a constant current of 5 C until the potential of the action electrode reached 3.0 V (vs. $Li^+/Li$). A discharge capacity [mAh/g] per weight of the active material at the 5 C constant current discharge was measured. From the results, a ratio of the 5 C discharge capacity/1 C constant current-constant voltage charge capacity was calculated as an indicator. The test cell of Example 1 had a capacity ratio of 84.8.

After that, the glass cell for test of Example 1 was placed in an atmosphere of 45° C. In this environment, the glass cell for test of Example 1 was subjected to a cycle test of 1 C constant current-constant voltage charge (stopping time: 3 hours)/1 C discharge. From a ratio of a discharge capacity in the first cycle in the cycle test to a discharge capacity at the 100th cycle, a cycle retention after 100 cycles was calculated, whereby the cycle characteristic was evaluated. The cycle retention of the glass cell for test of Example 1 was 85.1%.

<Production of Nonaqueous Electrolyte Battery>

Next, using the electrode of Example 1, a nonaqueous electrolyte battery of Example 1 was produced.

(Preparation of Negative Electrode)

The active material for a battery of Example 1, acetylene black, carbon nanofiber, and PVdF were placed into N-methylpyrrolidone (NMP), which was a dispersion solvent, in a mixing ratio of 100 parts by mass:10 parts by mass:10 parts by mass:10 parts by mass, and mixed to prepare a slurry. The obtained slurry was coated on both sides of a current collector formed of an aluminum foil having a thickness of 12 μm to obtain a coating film. The obtained coating film was dried and sprayed to produce a negative electrode. The total weight of the electrode was adjusted to 60±2 $g/m^2$.

The same procedures were repeated to produce multiple negative electrodes.

(Production of Positive Electrode)

Multiple positive electrodes were produced in the following procedures. First, a powder of $LiNi_{0.5}Co_{0.2}Mn_{0.3}O_2$, which was a positive electrode active material, acetylene black and carbon nanofiber, which were conductive aids, and polyvinylidene fluoride (PVdF), which was a binder, were prepared. The powder of $LiNi_{0.5}Co_{0.2}Mn_{0.3}O_2$, acetylene black, carbon nanofibers, and PVdF were placed into N-methylpyrrolidone (NMP), which was a dispersion solvent in a mixing ratio of 100 parts by mass:10 parts by mass:10 parts by mass:10 parts by mass, and mixed to prepare a slurry. The obtained slurry was coated on both sides of a current collector formed of an aluminum foil having a thickness of 12 μm to obtain a coating film. The obtained coating film was dried and pressed. Thus, the positive electrode was produced. The coating weight of the positive electrode [$g/m^2$] was adjusted so that a ratio of positive electrode charge capacity A per weight of the active material [mAh/g] to a negative electrode charge capacity B per weight of the active material [mAh/g], A/B, was 1.0.

(Production of Electrode Group)

Next, a belt-shaped separator containing mainly polyethylene and having a thickness of 15 μm was prepared. The separator had a zigzag form.

The positive electrodes and the negative electrodes, prepared as above, were inserted alternatively into spaces formed in parts of the zigzagged separator facing each other, whereby the positive electrodes faced the negative electrodes through the separators.

Next, a part on which the positive electrode layer was not formed in the positive electrode current collector of each positive electrode was welded to the positive electrode terminal. Similarly, a part on which the negative electrode layer was not formed in the negative electrode current collector of each negative electrode was welded to the negative electrode terminal.

Thus, an electrode group of Example 1 was obtained.

(Production of Battery)

Next, a container formed of a laminate film was prepared. The electrode group produced above was housed in the container.

On the other hand, 1 M of $LiPF_6$ was dissolved in a mixed solvent of containing propylene carbonate and diethyl carbonate at a volume ratio of 1:2 to prepare a nonaqueous electrolyte. The nonaqueous electrolyte was poured into the container in which the electrode group was housed, and the container was sealed.

Thus, a nonaqueous electrolyte battery of Example 1 having a capacity of 5.0 Ah and a potential range of 1.5-2.8 V was produced.

<Safety Test>

The nonaqueous electrolyte battery of Example 1, produced as described above, was subjected to a safety test as shown below.

First, the nonaqueous electrolyte battery of Example 1 was charged at a constant current of 0.2 C until the charge potential reached 2.8 V, and then charged at a constant voltage, thereby obtaining a 100% state-of-charge (SOC). The stopping time was 10 hours.

Next, the nonaqueous electrolyte battery of Example 1 in the 100% of SOC was subjected to a forced short-circuit test. Specifically, a round bar having a radius of 10 mm was pushed against the center part of the battery, and the battery was crushed. A thermocouple was set on a part near to the crushed part on the battery surface, change with time of a temperature was measured over one hour, and the maximum attainment temperature (° C.) was obtained. The maximum attainment temperature was 42° C.

Comparative Example 1

In Comparative Example 1, an active material for a battery of Comparative Example 1 was produced in the following procedures.

First, a core particle was prepared in the same manner as in Example 1.

Next, the core particle was placed into a solution containing sucrose to obtain a mixture. The mixture was fired at 700° C. in a reducing atmosphere. Thus, active material particles of Comparative Example 1, having a carbon-coated layer, were produced.

A glass cell for test of Comparative Example 1 and a nonaqueous electrolyte battery of Comparative Example 1 were produced in the same manner as in Example 1 except that the active material for a battery of Comparative Example 1 was used. The resulting products were evaluated in the same manner as in Example 1.

The capacity, cycle test, and maximum attainment temperature in the safety test for the nonaqueous electrolyte batteries of Example 1 and Comparative Example 1 are shown in Table 1 below.

TABLE 1

|  | 5 C/1 C Discharge Capacity Ratio (%) | 45° C. Cycle Test Capacity Retention (%) | Safety Test Maximum Attainment Temperature (° C.) |
| --- | --- | --- | --- |
| Example 1 | 84.8 | 85.1 | 42 |
| Comparative Example 1 | 90.1 | 80.4 | 100 |

From the results shown in Table 1, it was found that the glass cell for test of Example 1 was a little inferior to the glass cell for test of Comparative Example 1 in the rate performance. However, the nonaqueous electrolyte battery of Example 1 showed better results in the cycle test and the safety test than those of the nonaqueous electrolyte battery of Comparative Example 1. From the results of the cycle test, in the nonaqueous electrolyte battery of Example 1, the electron conductivity was more suppressed compared to the carbon material, and thus an improvement tendency in the capacity retention ratio can be confirmed. From the results of the safety test, in the nonaqueous electrolyte battery of Example 1, it is demonstrated that heat-generation is suppressed, and it is found that excellent safety was shown by decreasing the electron conductivity of the surface layer.

As described above, according to at least one of the embodiments and Examples, the active material for a battery is provided. The active material for a battery contains the active material particles. The active material particle contains the core particle, and the shell layer which covers at least a part of the surface of the core particle. The core particle contains the monoclinic or orthorhombic niobium-titanium composite oxide. The shell layer contains the compound which is at least one compound selected from the group consisting of a lithium-titanium composite oxide, an Nb-containing lithium-titanium composite oxide, a lithium-niobium composite oxide, a lithium phosphate, and an Nb-containing lithium phosphate, and which has a composition different from that of the monoclinic or orthorhombic niobium-titanium composite oxide in the core particle. The monoclinic or orthorhombic niobium-titanium composite oxide contained in the core particle has many sites for inserting and extracting lithium per unit volume, and thus can realize a large capacity. The compound contained in the shell layer can prevent conduction of a short-circuit current. For that reason, the active material for a battery according to the first embodiment can realize a nonaqueous electrolyte battery capable of showing high capacity and excellent safety.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising:
    an active material particle including
    a core particle containing a monoclinic or orthorhombic niobium-titanium composite oxide, and
    a shell layer, which covers at least a part of a surface of the core particle,
    wherein
    the shell layer contains a compound which is at least one compound selected from the group consisting of a lithium-titanium composite oxide, an Nb-containing lithium-titanium composite oxide, a lithium-niobium composite oxide, a lithium phosphate, and an Nb-containing lithium phosphate, and the compound has a composition different from that of the monoclinic or orthorhombic niobium-titanium composite oxide.

2. The active material according to claim 1, wherein the lithium-titanium composite oxide has a tetragonal type crystal structure, the lithium-niobium composite oxide has a trigonal type crystal structure, the Nb-containing lithium-titanium composite oxide has a tetragonal type crystal structure, and the lithium phosphate has a monoclinic crystal structure; and
    the shell layer contains at least one compound selected from the group consisting of the lithium-titanium composite oxide, the lithium-niobium composite oxide, the Nb-containing lithium-titanium composite oxide, and the lithium phosphate.

3. The active material according to claim 1, wherein the shell layer contains an amorphous structure.

4. The active material according to claim 1, wherein an element ratio of Nb/Ti in the core particle is $1.5 \leq Nb/Ti < 2.5$.

5. The active material according to claim 1, wherein the shell layer contains the Nb-containing lithium-titanium composite oxide, and the Nb-containing lithium-titanium composite oxide has an Nb content within a range of 1 atm % to 20 atm %.

6. The active material according to claim 1, wherein an atomic concentration of an Nb-element in the shell layer is gradually decreased from a point of on a surface of the core particle toward a surface of the active material particle.

7. The active material according to claim 1, wherein the shell layer has a thickness within a range of 0.1% to 30% of an average particle size of the core particle.

8. The active material according to claim 1, wherein the active material particle contains the shell layer in a content of 0.1% to 15% by weight relative to the mass of the active material particle.

9. The active material according to claim 1, wherein the shell layer covers a whole surface of the core particle.

10. A nonaqueous electrolyte battery comprising:
    a negative electrode containing the active material according to claim 1;
    a positive electrode; and
    a nonaqueous electrolyte.

11. A battery pack comprising the nonaqueous electrolyte battery according to claim 10.

12. The battery pack according to claim 11, further comprising:
    a power distribution external terminal; and
    a protective circuit.

13. A battery pack comprising nonaqueous electrolyte batteries, each of the nonaqueous electrolyte batteries comprising:
    a negative electrode comprising the active material according to claim 1;
    a positive electrode; and
    a nonaqueous electrolyte;
    wherein the nonaqueous electrolyte batteries are electrically connected in series, in parallel, or with a combination of series connection and parallel connection.

14. A vehicle comprising the battery pack according to claim 11.

15. The vehicle according to claim 14, wherein the battery pack is configured to recover a regenerative energy caused by a power of the vehicle.

* * * * *